US012709935B2

(12) United States Patent
Peck et al.

(10) Patent No.: US 12,709,935 B2
(45) Date of Patent: Aug. 18, 2026

(54) OPERATION OF FENESTRATION UNIT BASED ON SOLAR LOADING OFFSET FOR ENVIRONMENT CONTROL

(71) Applicant: Marvin Lumber and Cedar Company, LLC, Eagan, MN (US)

(72) Inventors: Aaron Morgan Peck, Minneapolis, MN (US); Aaron Joseph Soloway, San Francisco, CA (US); Daniel Jon Curtis, Warroad, MN (US); Mark Andrew Butzer, Saint Paul, MN (US); Thomas James Hensrud, Apple Valley, MN (US)

(73) Assignee: Marvin Lumber and Cedar Company, LLC, Eagan, MN (US)

( * ) Notice: Subject to any disclaimer, the term of this patent is extended or adjusted under 35 U.S.C. 154(b) by 852 days.

(21) Appl. No.: 18/099,649

(22) Filed: Jan. 20, 2023

(65) Prior Publication Data

US 2023/0235610 A1 Jul. 27, 2023

Related U.S. Application Data

(60) Provisional application No. 63/368,608, filed on Jul. 15, 2022, provisional application No. 63/301,926, filed on Jan. 21, 2022.

(51) Int. Cl.
*E05F 15/71* (2015.01)

(52) U.S. Cl.
CPC ......... *E05F 15/71* (2015.01); *E05Y 2400/818* (2013.01); *E05Y 2400/85* (2013.01); *E05Y 2400/8515* (2024.05); *E05Y 2900/148* (2013.01)

(58) Field of Classification Search
CPC ............... E05F 15/71; E05Y 2400/818; E05Y 2400/85; E05Y 2400/8515; E05Y 2900/148; E05Y 2400/66
See application file for complete search history.

(56) References Cited

U.S. PATENT DOCUMENTS

| | | | | |
|---|---|---|---|---|
| 4,603,556 A * | 8/1986 | Suefuji | .................... F24F 11/86 62/228.4 |
| 8,726,586 B1 | 5/2014 | Stevens et al. | |

(Continued)

FOREIGN PATENT DOCUMENTS

| | | |
|---|---|---|
| CN | 104314410 | 1/2015 |
| CN | 106639731 | 5/2017 |

(Continued)

OTHER PUBLICATIONS

"Automatic window ventilation—natural and energy efficient", [Online]. Retrieved from the Internet: https: www.geze.com en discover topics automatic-ventilation, 16 pgs.

(Continued)

*Primary Examiner* — Rami R Okasha
(74) *Attorney, Agent, or Firm* — Schwegman Lundberg & Woessner, P.A.

(57) ABSTRACT

A fenestration unit controller can be used to control automated opening or closing of fenestration units such as windows. The controller can be configured to receive an environment comfort target characteristic for an indoor environment. The indoor environment can include a fenestration unit that can be remotely controlled. The controller can be configured to receive atmospheric status information about the outdoor environment, and information about a solar loading offset for the indoor environment. The controller can determine a difference between the atmospheric status information and the environment comfort target characteristic. The controller can control the fenestration unit, such as to open or close the unit, based on the solar loading offset for the indoor environment and on the determined difference between the atmospheric status information and the environment comfort target characteristic.

40 Claims, 18 Drawing Sheets

(56) References Cited

U.S. PATENT DOCUMENTS

| | | | | |
|---|---|---|---|---|
| 11,231,192 | B1 | 1/2022 | Shah | |
| 2007/0072541 | A1* | 3/2007 | Daniels, II | F24F 11/70<br>454/365 |
| 2010/0025483 | A1* | 2/2010 | Hoeynck | H02J 3/14<br>236/1 C |
| 2013/0085608 | A1 | 4/2013 | Bornside et al. | |
| 2016/0333638 | A1* | 11/2016 | Cascia | F24F 11/64 |
| 2017/0154517 | A1 | 6/2017 | Aliakseyeu et al. | |
| 2020/0072674 | A1* | 3/2020 | Baker | G01J 5/027 |
| 2022/0057761 | A1* | 2/2022 | Watanabe | G02F 1/163 |
| 2022/0082285 | A1* | 3/2022 | Stevenson | F24F 7/007 |
| 2022/0381472 | A1* | 12/2022 | Kim | F24F 11/56 |
| 2022/0385063 | A1* | 12/2022 | Protzman | H05B 47/11 |
| 2023/0388146 | A1* | 11/2023 | Collins | G05B 19/054 |

FOREIGN PATENT DOCUMENTS

| | | |
|---|---|---|
| CN | 112696737 | 4/2021 |
| KR | 100424970 | 3/2004 |
| KR | 100424971 | 3/2004 |
| KR | 101486997 | 1/2015 |
| KR | 101997724 | 7/2019 |
| WO | 2021103959 | 6/2021 |

OTHER PUBLICATIONS

Oseland, Nigel A., "Acceptable Temperature Ranges in Naturally Ventilated and Air-Conditioned Offices", American Society of Heating, Refrigerating and Air-Conditioning Engineers, Inc., (1998), 12 pgs.

* cited by examiner

OPERATION OF FENESTRATION UNIT BASED ON SOLAR LOADING OFFSET FOR ENVIRONMENT CONTROL

This application is related to and claims priority to U.S. Provisional Application No. 63/301,926, filed on Jan. 21, 2022, and entitled "CONNECTED HOME," the entirety of which is incorporated herein by reference, and this application is related to and claims priority to U.S. Provisional Application No. 63/368,608, filed on Jul. 15, 2022, and entitled "CONNECTED HOME," the entirety of which is incorporated herein by reference.

BACKGROUND

Fenestration units including window, door and skylight assemblies provide daylight-delivering elements and access to buildings. Window, door and skylight assemblies facilitate views from the exterior of a building, access between the interior and exterior, and the delivery of daylight to otherwise enclosed or indoor spaces. With a skylight assembly, a roof is penetrated, and the assembly is installed to provide daylight in a vertical manner to an enclosed space.

In other examples, fenestration units can be operable to provide ventilation to the building. For instance, window assemblies include opening sashes that are slid within a frame or rotated relative to the frame to open and provide ventilation. Operable skylights (e.g., capable of opening) or other windows can be rotated relative to hinges interconnecting an end of a sash to the frame to provide ventilation along, e.g., a bottom or sides of the assembly.

Screens, such as interlaced metal wire screens, can be included with fenestration assemblies to intercept and prevent the ingress of insects, debris, such as foliage, or the like. In single or double hung window assemblies, interlaced wire screens are provided across the frame opening and on the exterior of a frame, such as between the sashes and the exterior or outdoor environment. In casement window assemblies and operable skylight assemblies, interlaced wire screens are installed on the interior side of frames and can span the frame opening.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
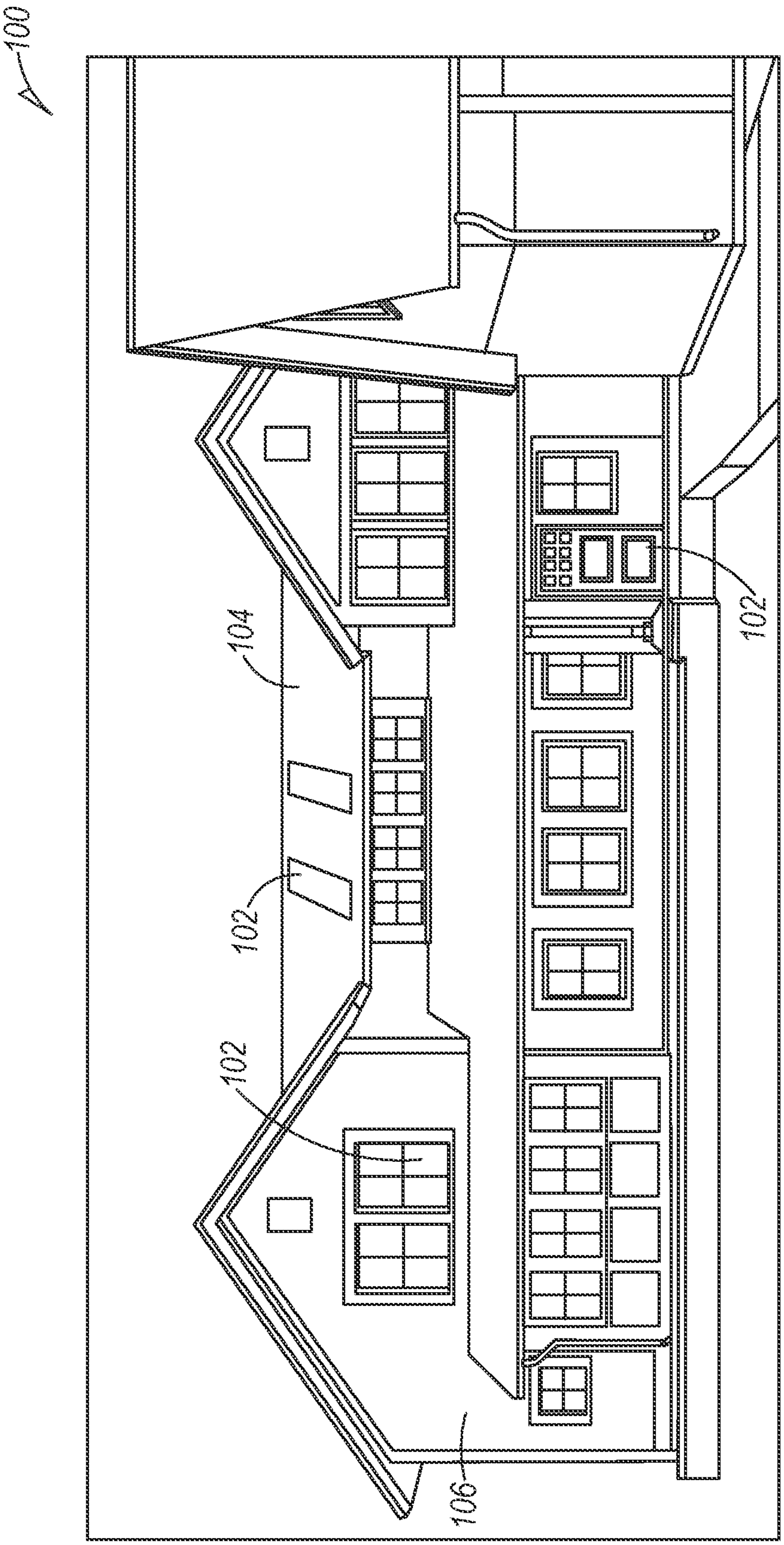
FIG. 1 illustrates generally a schematic view of an example of a building.

Fenestration units such as windows can be automatically operated to open or close. In an example, a rules-based, processor circuit-implemented fenestration control algorithm can be applied to determine or control when, or under what conditions, to open or close one or more fenestration units and, in turn, modulate the atmosphere of an indoor environment. That is, opening or closing a fenestration unit can change a characteristic of the atmosphere of an indoor environment.

Characteristics of an atmosphere of an indoor environment can include temperature (e.g., air temperature, "feels like" temperature, object temperature, etc.), humidity (e.g., relative humidity), dew point, wind or breeze speed, sunlight exposure, air quality, or one or more other characteristics of the environment that can affect a comfort, health, occupant experience, or safety of an occupant of the indoor environment.

In an example, the fenestration control algorithm can be configured to achieve various goals for the indoor environment or for a particular occupant of the indoor environment. For example, a goal can include maximizing an amount of time that windows are open, thereby increasing opportunities for introduction of fresh air to the indoor environment, such as a home. In an example, the algorithm can be configured to ensure occupant comfort in the indoor environment year-round, with minimal input and adjustment by the occupant or other user. For example, the algorithm can be configured to automatically account for changing seasons, hours of daylight, sun position, and more. In some examples, the algorithm can accommodate or can control an active heating, cooling, or ventilation system (HVAC) that serves the indoor environment. In an example, the algorithm can be configured to use or receive data from one or more environment status sensors and use the sensor data to update or adjust the control of one or more fenestration units that serve, or are coupled to, an indoor environment.

Automated fenestration units can be used to help realize opportunities for operating windows without the involvement of the occupant. Such automation can help lower occupant cognitive load with respect to environment control, such as by reducing risk and worry over weather conditions. Furthermore, a frequency of window use or operation can increase when window operation is automated, such as by making groups of windows open and close together. The present inventors have recognized a need for automated systems that can replace or alleviate the demand on users to open and close windows manually. Furthermore, the present inventors have analyzed weather data from various geographic locations and identified opportunities to increase occupant access to fresh air by opening windows automatically when outdoor conditions are satisfactory. Automated systems can help increase access to fresh air by, for example, operating windows during nighttime hours when occupants may be asleep or otherwise unable to operate a window manually, but when such occupants can nevertheless benefit from fresh air or air exchange.

In an example, the fenestration control algorithm can be configured to use atmospheric status information about an outdoor environment and solar loading information about an indoor environment to determine whether or when to open or close a fenestration unit. In some examples, the information can be used together with security policies, user-defined goals or preferences for health or comfort, to determine whether or when to open or close a particular fenestration unit. Furthermore, the information can be used with other system-wide safety policies or safeguards, for example, to ensure windows (e.g., a particular window or group of windows) are not opened or are actively closed in inclement weather, such as when high winds, rain, or low air quality are reported at or near the vicinity of the controlled environment.

In an example, the fenestration control algorithm can comprise a portion of, or can include or use, a state machine that controls operation of a particular fenestration unit or group of units. The state machine can be configured to interrupt or override instructions from, e.g., the fenestration control algorithm, to ensure a fenestration unit closes or remains closed under particular circumstances. The state machine can be configured to shut windows or disallow window opening when, for example, (a) wind or wind gusts exceed a specified threshold strength or frequency, (b) outdoor air quality is poor relative to a specified threshold air quality, (c) a storm advisory is active, such as an advisory from a national or local weather authority, (d) a security system is activated, (e) a window is in, or is moved to, an undesired position (e.g., exceeds an opening amount threshold, such as to prevent ingress or egress of people or objects), (f) a temperature of a window-local controller (e.g., comprising control circuitry, motors, actuators, etc.) meets or exceeds a low-temperature or high-temperature threshold, (g) a power source is or becomes unavailable, or (h) other home sensors indicate an unsafe or undesired atmospheric or other status, such as indicating low temperature, high humidity or water ingress, or other condition of an indoor environment.

Atmospheric status information about an outdoor environment can include information about, among other things, temperature, humidity, dew point, wind or breeze speed, sunlight, or air quality, and can optionally include information about time of day or time of year, or a presence or absence of precipitation. The present inventors have recognized that the atmospheric status information can be measured locally using various sensors or can be received from centralized servers or databases. For example, outdoor temperature information or outdoor humidity information can be received from external (e.g., commercial) weather information sources via a network. The outdoor atmospheric condition or weather data can indicate atmospheric conditions at, near, proximal to, or otherwise in the vicinity of the indoor environment. For example, the outdoor atmospheric condition or weather data can be measured using sensors that are coupled to or adjacent to the indoor environment, or using sensors that are near but spaced apart from the indoor environment. In an example, the sensors can be disposed within a few meters or kilometers of the indoor environment.

Atmospheric conditions of an indoor environment can be influenced by solar loading or radiation from the sun. Solar loading can include an increase in temperature of the indoor environment (or objects that comprise, or are inside, the indoor environment) in response to solar radiation. Solar loading can include a quantified thermal stress effect of solar radiation on structural or non-structural components of the indoor environment. The magnitude of the effect of solar loading can be influenced by, for example, changes in radiation or temperature, a coefficient of heat transfer with respect to particular objects, and solar absorptivity of objects or other components that comprise the indoor environment, among other things.

The present inventors have recognized that solar loading can impact how an indoor environment receives and retains solar energy, which in turn can impact a decision (e.g., an automated decision) about changing a position, or open/close status, of a fenestration unit. For example, the fenestration control algorithm can be configured to use information about a solar loading offset for an indoor environment to determine whether, and to what extent, to change a position of one or more fenestration units for the indoor environment. In an example, the solar loading offset can be used to determine whether to open or close a window when outdoor temperatures are outside of a specified temperature range. The present inventors have found, through investigative studies, that applying a solar loading offset can help increase opportunities to open fenestration units and thereby introduce outdoor air to the indoor environment without compromising occupant comfort.

In an example, information about solar loading for the indoor environment can be measured or otherwise provided by a user or occupant of the indoor environment. For example, the information about solar loading can include a quantitative solar loading offset that represents susceptibility of a particular indoor environment to solar loading. The susceptibility can be measured and quantified, for example, by correlating solar transmittance with temperature changes. A solar loading offset can depend on, among other factors, a thermal mass of components that comprise the indoor environment and/or objects or components inside of the indoor environment.

The present inventors have further found that receiving input from system users or occupants about solar loading can be an effective and reliable way to help predict and provide occupant comfort in different weather conditions. For example, a home with a polished concrete floor can be perceived by an occupant as being cooler throughout the day than a similar home with a carpeted floor, despite exhibiting the same, or substantially the same, indoor air temperatures. In another example, a single-level home with a full basement may equalize in temperature overnight, while a multi-level home can retain heat on upper levels for longer periods of time. Occupants of homes or indoor environments that have an objectively similar solar loading characteristic (e.g., due to construction type or insulation values, among other things) can experience different effects from the sun's energy due to many variables such as shade from trees and neighboring buildings, occupancy, foundation style, orientation, how rooms are used throughout the day, paint color, flooring, window dressings, etc.

In some examples, the susceptibility to solar loading can be abstracted or quantified to a numerical scale (or other scale) to help facilitate user control. For example, a user can provide a solar loading offset on a scale of, e.g., 0 to 10, with 0 indicating a least susceptibility to solar loading and 10 indicating a highest susceptibility to solar loading. On this example scale, a lower solar loading offset can correspond to an indoor environment that is partially or completely shaded such that the indoor environment receives solar energy only indirectly and, accordingly, may not experience significant fluctuation in indoor temperature changes with changing amounts of incident sunlight. A higher solar loading offset can correspond to an indoor environment that receives solar energy directly and, accordingly, experiences fluctuation in indoor temperature changes with changing amounts of incident sunlight. Some characteristics that are likely to correspond to higher solar loading offset values can include morning sun-direction exposure, shallow eaves, poor roof ventilation or minimal roof or attic insulation, dark colored exterior walls, lightweight buildings (e.g., comprising wood framing and narrow walls) with small basements or without a basement, crawlspaces, or slab-on-grade construction.

The present inventors have further recognized that a solar loading offset for a particular indoor environment can change over time, such as with the seasons, for example, together with changes in shade or sun angle. Trees may lose leaves in winter, and southern facing windows with shady overhangs may be more exposed when the sun angle is low in winter. Other changes in the greater vicinity of the indoor environment can similarly change a solar loading offset, such as due to neighboring new construction that may impede or otherwise change an amount of solar radiation that is directly or indirectly incident on the indoor environment. Accordingly, solar loading offset values can be updated or adjusted, such as periodically throughout a year, to help optimize performance of the system. In some examples, the fenestration control algorithm can include or use a machine learning model to help optimize solar loading offset values and maintain occupant comfort, as further explained below.

Systems and methods discussed herein, including the fenestration control algorithm, can be configured or used to control ventilation of an indoor environment (e.g., a home, an office, etc.) with automated fenestration operation to bring outdoor conditions, such as fresh air, to an interior of a building while maintaining occupant comfort. In some examples, a fenestration unit or group of units can be selectively opened based on information about outdoor fresh air preferences to create a comfortable indoor experience for the occupant using the outdoor fresh air.

The present inventors have recognized that occupants of a particular indoor environment may have different preferences or parameters for "comfort" in an outdoor environment relative to an indoor environment. In an indoor environment, an occupant generally specifies indoor comfort with a thermostat type temperature set-point value or range of values, such as "room temperature" (e.g., 68 to 72 degrees Fahrenheit). The present inventors have recognized that an additional or alternative approach can include using preference information about outdoor environment conditions, such as in contrast to indoor conditions, because the occupant may have different preferences as to what is considered "comfortable" in an outdoor setting. For example, outdoor condition preferences for comfort may vary, sometimes significantly, relative to their corresponding indoor parameters, such as room temperature. For instance, the same occupant having a room temperature or a thermostat type temperature set-point preference value for indoor comfort may have other outdoor condition preferences such as for a range of temperatures, e.g., between 65 and 78 degrees. In other words, an individual tolerance for what defines upper or lower limits of "comfort" may be different according to the type of environment involved, such as according to whether the environment is indoors or outdoors. In some examples, occupants may desire to experience, at or in an indoor environment, more outdoor conditions and atmospheric condition or status variation when windows are open. That is, occupants may desire or may be more tolerant of temperature changes resembling outdoor conditions when fresh air is introduced to an indoor environment, for instance with automatically operated fenestration units. Accordingly, an environment comfort target characteristic for an indoor environment can be based on information about a user preference for particular atmospheric conditions in an outdoor environment, including, but not limited to, preferences for particular temperatures or temperature ranges, particular humidity or humidity ranges, draft or wind speeds or speed ranges or the like, among others.

In an example, the fenestration control algorithm discussed herein is configured to control fenestration opening and closing to bring outdoor conditions (e.g., fresh air, breeze, humidity and temperature) into an indoor environment when the outdoor conditions meet threshold conditions established by an occupant or user. The threshold conditions can include set-point type values for different atmospheric characteristics, ranges of such characteristics, or combinations of specific values and ranges. In some examples, the inclusion of indoor temperature settings, such as room temperature settings in the manner of a thermostat, can be unreliable or incompatible in the context of coordination with bringing outdoor conditions to an indoor environment. For example, after an interior environment is exposed to the outdoor environment (e.g., after fenestration units are opened), it can be difficult to use indoor temperature settings in a reliable manner with mixing of outdoor air and interior air to provide a comfortable environment to the occupant over time.

In some embodiments, an occupant sets an environment comfort target characteristic (or uses baseline or initial outdoor condition preference settings) that can include, but is not limited to, one or more of a temperature range, humidity range, wind speed range, wind direction, or the like, as one or more target characteristics for opening and closing fenestration units. As the outdoor environment meets the target characteristic, the fenestration units can be opened to admit fresh outdoor air to the interior environment of a building. Conversely, as the outdoor environment deviates from or fails to meet the target characteristic, the fenestration units can be closed. The systems described herein, in some examples, facilitate generation and maintenance of a virtual outdoor environment within an indoor setting (e.g., in an indoor environment) according to or using automated opening and closing (and moderating of the same between fully/partially open and fully/partially closed positions) of fenestration units based on indoor and/or outdoor preferences for a user or occupant.

FIG. 1 is a schematic view of one example of a building 100. The building 100 includes one or more of a commercial, residential, municipal or other building such as a home, office building, warehouse, storage facility or the like. The building 100 includes a building upper portion 104 such as a (flat or sloped) roof, awning or the like and one or more building walls 106, or other barriers, that bound or enclose at least a portion of an indoor environment inside the building 100.

The building 100 includes one or more fenestration units 102 provided on one or more of the building upper portion 104 and the building walls 106. For instance, as shown in FIG. 1, one or more skylight fenestration units 102 can be provided along the building upper portion 104. As described herein, the fenestration units 102 corresponding to the skylights shown in FIG. 1 are operable, for instance remotely operable or automatically operable, to accordingly provide modulated control of various services or features including lighting and ventilation to the interior, or indoor environment, of the building 100.

In other examples, the fenestration units 102 described herein and shown, for instance, in FIG. 1, include one or more of windows, doors or the like. The fenestration units 102 can include, but are not limited to, one or more of double hung, casement, awning or other windows installed in the building walls 106. The fenestration units 102 can include a door including, but not limited to, a sliding door, swinging door, or the like. As provided herein, a reference to a skylight or window should not be considered an exclusive reference and may refer to one of the alternative fenestration units (e.g., windows, doors, skylights or one or more of the same) described herein, and accordingly operation of such fenestration units can be automated as discussed herein.

The fenestration units 102 can include a panel, such as a translucent panel, opaque panel (for instance with a door) and a surrounding fenestration frame. The panels described herein, such as translucent panels of the fenestration units 102, are configured to translate relative to the fenestration frame and accordingly provide a ventilation perimeter (e.g., optionally a continuous ventilation perimeter) opening around the unit to facilitate ventilation into and out of the building 100. In other examples described herein, the fenestration units 102 including, for instance, the skylight fenestration or other example fenestration assemblies previously described herein include one or more light modulating elements including, but not limited to, light arrays, shades or the like configured to supplement or throttle light delivered through or from the fenestration units into the interior of the building 100. As described herein, one or more building systems including, for instance, one or more of light modulating or ventilation modulating building systems are described that are configured to control one or more of light or ventilation through the one or more fenestration units 102, for instance, in coordination with one or more other features of the building 100 including, but not limited to, environmental conditioning units, additional or supplemental fenestration units, or the like.

A fenestration unit 102 can comprise a purpose-built unit with at least one operable component, such as can be operated or caused to operate from a control signal originated elsewhere or remotely, and that can conditionally or selectively allow air to flow through the unit. In an example, a fenestration unit 102 can include or comprise a legacy window device that can be retrofitted or updated to include one or more motors or actuators for remote control. Any one or more of the units can be an automated fenestration unit that can be remotely controlled or actuated to open and close. Some example automated fenestration units include or use a tilting mechanism to allow at least a portion of a unit (e.g., a glazing portion) to tilt or move away from a plane of a frame that comprises the unit. Awning or casement windows include examples of fenestration units that can tilt away from a frame plane. In other examples, a glazing portion can be configured to move laterally away from the frame. In some examples, a tilting fenestration unit can be opened to more efficiently capture or receive breezes or wind gusts from outside of an indoor environment, for example, to draw fresh air or outdoor air inside. In one example, a sash is tilted in a direction into the wind (e.g., upstream) and thereby guides air carried on the wind into the home. Similarly, a sash of a fenestration unit on another portion of the building is directed away from the wind (e.g., in a downstream direction) to facilitate exhausting of in-building air through the fenestration unit and to the building exterior.

In an example that includes a laterally-movable glazing portion, air can flow into or through the indoor environment (to the "inside") around all sides of the unit. A screen can be provided between the frame that surrounds a perimeter of the fenestration unit and the movable portion of the unit. Motors or other actuators can be provided to drive the movable portion of the unit away from the frame, for example, laterally. That is, while some windows may move only up or down, or left or right, within a frame (e.g., double hung windows, sliding windows or the like), a laterally-movable unit can include a glazing portion that can be controlled to move laterally away from the plane of its frame.

In an example, a tilting fenestration unit can be tilted to the right (or left) such that wind approaching the unit from the left (or right) is drawn inside. That is, in an example, the left side of the unit can be open or exposed (e.g., is directed upstream or into the wind) to receive fresh air while the right side of the unit is closed or sealed to thereby direct the received air into the building. Similarly, a unit can be tilted to the left such that wind approaching the unit from the right is drawn inside. Motors or other actuators of the tilting fenestration unit can be independently driven to achieve different tilt angles of the glazing portion relative to the frame. In other words, a tilting fenestration unit can be automatically opened in any of multiple directions to efficiently capture airflow or to deflect or avoid cross breezes or wind, and can help modulate intake and exhaust (e.g., between no flow, and full or open flow) into and out of the building 100, depending on the preferences of the system user.

In an example, a size or amount of a fenestration unit opening, or magnitude or degree of tilt for a tilting fenestration unit, can be controlled depending on weather conditions or user preferences. In an example, a maximum opening amount can be changed dynamically depending on wind speed, air temperature, humidity, or other weather conditions. In an example, a strength of an indoor airflow can be controlled by changing a distance or amount by which one or more of the fenestration units 102 (e.g., including one or more tilting fenestration units) opens or closes, or by changing a number of units that are opened or closed at a particular time. In an example, an amount by which a fenestration unit 102 is open (or closed) can be referred to or defined to corresponding to a particular opening profile (or closing profile) or "stage" between fully open and fully closed.

In an example, tilting fenestration units can be provided on multiple different sides or building walls 106 of an indoor environment of the building 100. Operation of the multiple units can be coordinated, for example using the building services system 200 or the ventilation-modulating fenestration system 300 discussed herein, to better accomplish user objectives such as maximizing window open time or maximizing introduction of outdoor air to an indoor environment.

Figure 2:
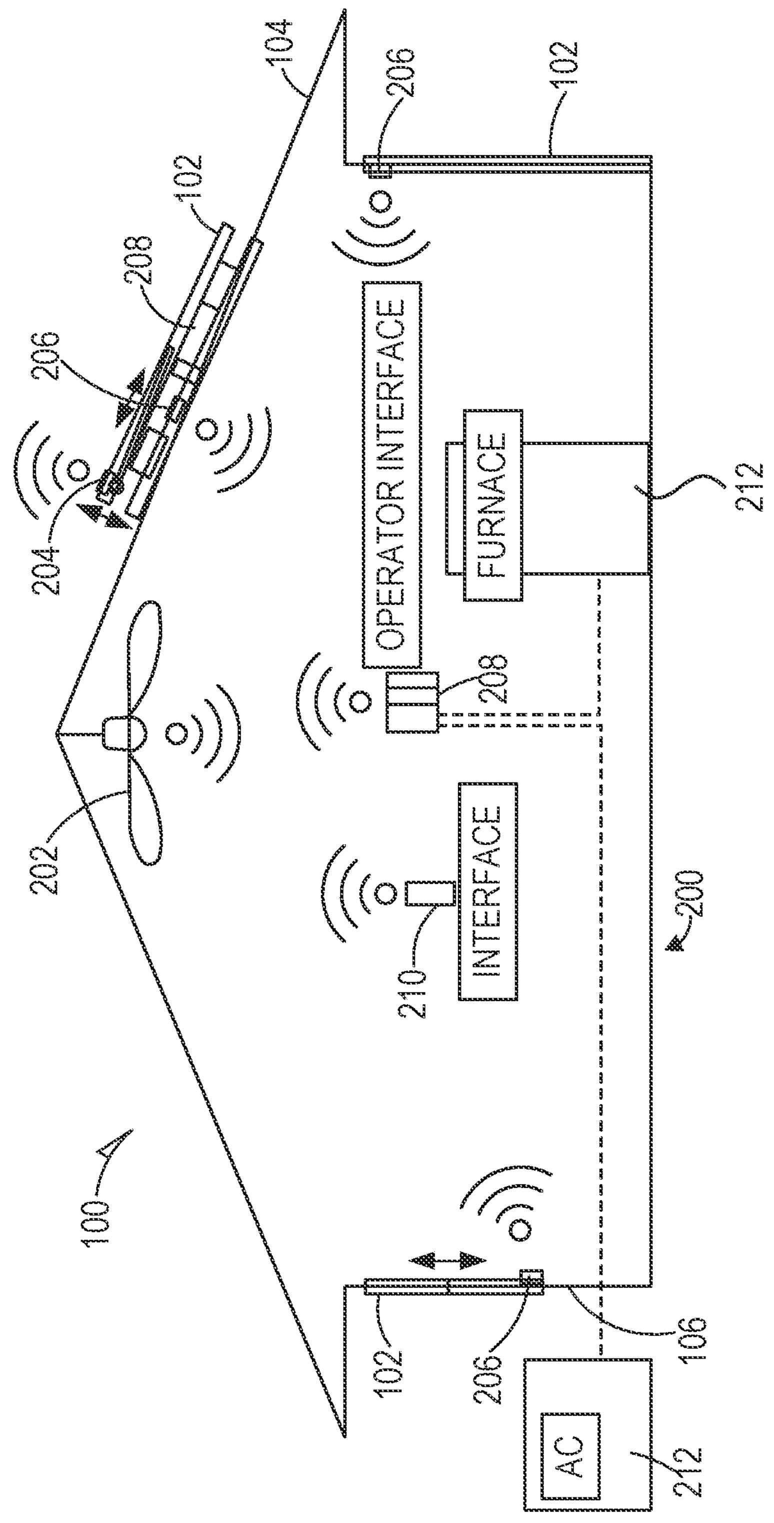
FIG. 2 illustrates generally a schematic view of an example of a building services system.

FIG. 2 is a schematic representation of a building such as the building 100. As shown in FIG. 2, one example of a building services system 200 is shown. In this example, the building services system 200 includes one or more ventilation modulating fenestration units or system. Each fenestration unit can be controlled, such as to open or close, in response to respective control signals from a centralized controller or processor circuit, such as a processor circuit configured to implement a fenestration control algorithm. In an example, the building services system 200 can additionally or alternatively include one or more light modulating fenestration systems.

In FIG. 2, a plurality of fenestration units 102 are installed in the building 100. For instance, one example of a fenestration unit 102 including, for instance, an operable skylight, is provided along the roofline or building upper portion 104 of the building 100. Additionally, a door type fenestration unit 102 is shown at the right of the figure while a window type fenestration unit 102, such as a double hung window including one or more operable sashes, is shown in the left portion of FIG. 2.

The building 100 can comprise one or more environmental or other sensors configured to sense or measure environmental conditions. The sensors can include, by way of example and not limitation, one or more of a light sensor, humidity sensor, a gas presence or concentration sensor such as an oxygen, carbon monoxide, carbon dioxide, or other gas sensor, temperature sensor, an airflow sensor, air quality sensor, smoke detector, pressure sensor, acoustic sensor, other sensor, combinations of the same, multiple iterations of various sensors (e.g., in different rooms), or the like.

Each of the fenestration units 102 optionally includes or can be coupled to one or more sensors. For instance, in the fenestration unit 102 corresponding to the skylight in FIG. 2, an interior sensor assembly 206 is provided with the fenestration unit 102. The interior sensor assembly 206 can include, but is not limited to, one or more sensors configured to measure light characteristics of ambient light such as brightness (intensity), light temperature (color), pressure or airflow at or through the unit, or the like. In other examples, the interior sensor assembly 206 is configured to measure or determine one or more of an opened or closed status of the fenestration unit such as the translucent panel, a degree of opening or closing of the translucent panel or the like. Optionally, the interior sensor assembly 206 includes one or more of an environment sensor, a building sensor, security system sensor, or the like, such as can be configured to monitor opening or closing of entrances and exits (e.g., buildings, doors, skylights or the like). In other examples, the interior sensor assembly 206 measures one or more of temperature (e.g., proximate to the interior of the fenestration unit 102 and proximate to the roof, crawl space or the like), humidity, airflow through the fenestration unit 102, or the like.

In an example, the interior sensor assembly 206 includes one or more of a transmitter or transceiver. In an example including a transmitter or a transceiver, the interior sensor assembly 206 is configured to provide information about the one or more of the detected characteristics to a controller, such as a controller configured to implement the fenestration control algorithm. For example, the transmitter can transmit information about light characteristics, environmental characteristics, operation characteristics or the like associated with the fenestration unit 102 and the indoor environment of the building 100 to one or more other features of the building services system 200 including, but not limited to, the controller or a system interface 210, an operator interface 208, or one or more other components of the building services system 200 including, but not limited to, one or more environment conditioning units 212, a fan 202 and one or more of the other fenestration units 102.

As further shown in FIG. 2, an exterior sensor assembly 204 is, in one example, provided with or near a fenestration unit 102, such as a unit installed along the building upper portion 104 of the building 100. In various examples, the exterior sensor assembly 204 detects, measures or determines one or more of light characteristics including ambient light (including daylight brightness), temperature, humidity, pressure, wind speed, wind direction, air quality, moisture (e.g., rain or snow) of the exterior environment at or surrounding the building 100, or airflow through a corresponding fenestration unit. As with the interior sensor assembly 206, the exterior sensor assembly 204 is optionally configured to include or use a dedicated transmitter or transceiver configured to accordingly transmit one or more of the detected or determined characteristics to one or more other components of the building services system 200 including, for instance, light or ventilation modulating controllers, the system interface 210, the operator interface 208, or the like. In other examples, a fenestration unit 102 includes an onboard controller (such as the light or ventilation modulating controllers described herein) and a sensor assembly can be hardwired or wirelessly connected with the onboard controller.

One or more of the operator interface 208 and the system interface 210 can include a controller, such as can comprise processor or logic circuits, computer readable media, programmed logic controllers, or the like, configured to operate one or multiple fenestration units 102 or to control operation of features of one or multiple fenestration units 102 according to the detected or determined characteristics including, for instance, environmental characteristics determined or detected with the exterior sensor assembly 204 or interior sensor assembly 206.

In FIG. 2, the fenestration unit 102 provided at the building upper portion 104 can include a panel operator. As described herein, the panel operator is configured to move one or more components of the fenestration unit 102 including, for instance, a panel to accordingly facilitate ventilation through the unit and into the indoor environment of the building 100.

As shown in FIG. 2, each of the fenestration units 102 including, for instance, the window shown on the left side and the door shown on the right side of the building 100, optionally include respective interior sensor assemblies 206. In one example, the sensor assemblies are configured to measure or detect one or more of an open or closed status of the respective fenestration assembly, one or more light characteristics including ambient light proximate to the respective fenestration assemblies, airflow through the fenestration assemblies, temperature or humidity information at the fenestration assemblies, or the like. As with the previously-described fenestration units 102, each unit shown in FIG. 2 such as including the door and the window, in one example, include respective transmitters or transceivers configured to provide one or more of their status or other measured or detected characteristics to one or more other features or components of the building services system 200.

The building services system 200 can include other components including, but not limited to, environmental conditioning units such as the fan 202 and the environment conditioning unit 212. In an example, the environment conditioning unit 212 includes one or more of a furnace, air exchanger, heat pump, geothermal unit or the like. Another example of an environment conditioning unit 212 is shown exterior to the building 100 and in communication with one or more interior components of the building 100. The environment conditioning unit 212, in one example, includes an air conditioning unit, a heat pump, geothermal unit or the like.

The building services system 200 can include one or more interfaces. For example, the system interface 210 can include one or more of a bus, hardwiring (e.g., an Ethernet network) or wireless network to provide power or data communication among the components of the building services system 200 including, for instance, one or more of the fenestration units 102, the environment conditioning units 212, or other components of the building services system 200. In another example, the system interface 210 communicates with a portable controller such as an application-based controller, tablet, smartphone or the like. Optionally, a controller for the system is provided at least in part at or in the operator interface 208, such as in contrast to a portable tablet, smartphone or the like. The operator interface 208, whether installed in the building 100 or provided on one or more application-based devices such as a tablet, smartphone or the like, includes one or more modules, circuits, or computer readable media configured to provide the functions of a thermostat, ventilation modulation controller or light modulation controller, and can be configured to coordinate operation of the various fenestration units 102 and optionally one or more of the environmental conditioning units, or the like. In one example, as described herein, the operator interface 208 includes a home automation controller and interacts with one or more of the fenestration units 102 and one or more of the environment conditioning units 212 to coordinate their operation and function. In one example, the operator interface 208 includes an onboard system interface 210 including, for instance, a wireless modem, switch or the like. In another example, the operator interface 208 communicates with the one or more components of the building services system 200 through the system interface 210 used as an intermediate device (e.g., using a wireless modem or router).

Figure 3:
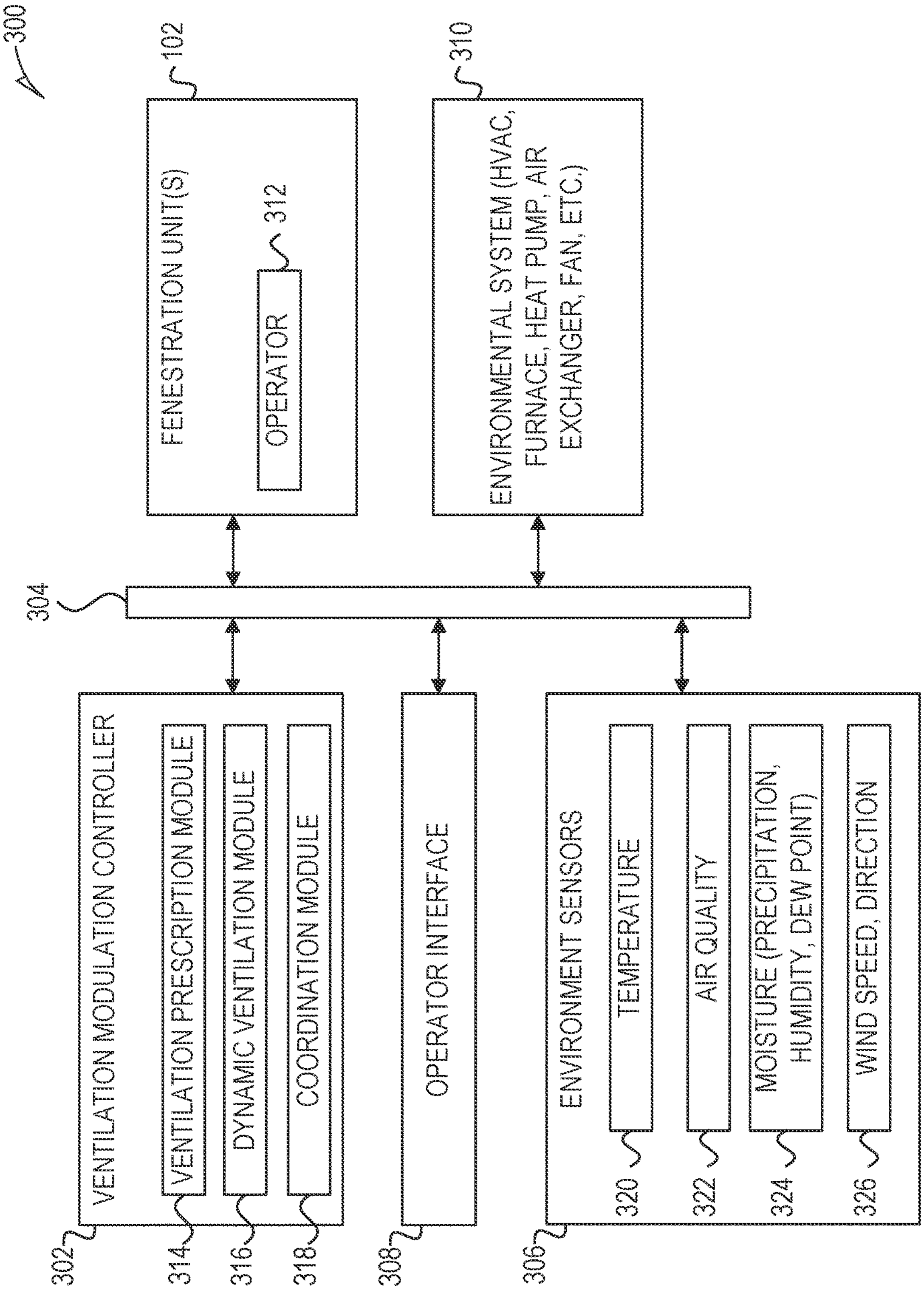
FIG. 3 illustrates generally an example of ventilation-modulating fenestration system.

FIG. 3 illustrates generally an example of a ventilation-modulating fenestration system 300 in accordance with an embodiment. The ventilation-modulating fenestration system 300 can comprise a portion of the building services system 200 for the building 100 and can be configured to modulate ventilation in, or fresh outdoor air exposure to, an indoor environment of the building 100. In an example, the ventilation-modulating fenestration system 300 comprises a bus 304 that is configured to provide communication among and between components of the ventilation-modulating fenestration system 300 such as to execute a portion of a fenestration control algorithm. The ventilation-modulating fenestration system 300 includes, among other things, the bus 304, a ventilation modulation controller 302, an operator interface 308 (e.g., comprising the operator interface 208), one or more environment sensors 306, one or more fenestration units 102, and can optionally include an environmental system 310 that serves the building 100 or an indoor environment portion of the building 100.

In the example of FIG. 3, the ventilation-modulating fenestration system 300 includes one or more fenestration units 102. Each fenestration unit 102 can include a respective operator 312. The operator 312 can comprise one or more of the automated operators described herein. One example of an operator can include a chain drive and associated electric motor, hydraulic motor, or the like, configured to move a fenestration panel between open and closed positions, including intermediate positions (e.g., including partially open or partially closed positions). In an example, the operator 312 can include a manual control for operating the fenestration unit 102, such as can be used to override automated control of the unit.

In an example, the ventilation modulation controller 302 includes a ventilation prescription module 314, a dynamic ventilation module 316, and a coordination module 318. Any one or more of the modules can be combined or executed together using a particular system, such as the operator interface 208, such as can include or use an automation controller, programmed logic controller (PLC), smart thermostat, processor tablet computer, smartphone or the like. In another example, one or more other modules can be included with a PLC, processor, controller or the like associated with a particular fenestration unit 102.

The ventilation-modulating fenestration system 300 can include the operator interface 308. In an example, the operator interface 308 is in direct or indirect communication with the other components or modules of the ventilation-modulating fenestration system 300. For example, the operator interface 308 can be in communication with the ventilation modulation controller 302. In an example, the operator interface 308 can be used together with the ventilation modulation controller 302 to provide one or more specified ventilation prescriptions including operator prompts, specified ventilation schemes, or the like, for the system.

In an example, the ventilation modulation controller 302 includes the ventilation prescription module 314 with one or more stored ventilation schemes, input ventilation schemes or the like. In another example, the ventilation prescription module 314 facilitates the modification, updating or addition of ventilation schemes. In still another example, the operator interface 308 can comprise an input element or input feature configured to provide one or more ongoing prescriptions, operator prompts or the like to the ventilation prescription module 314 to modify schemes, add additional ventilation schemes or provide temporary or ongoing operator prompts to adjust operation of one or more of the fenestration units 102 and accordingly adjust the ventilation for an associated zone such as a building interior or indoor environment of the building 100.

In an example, the ventilation modulation controller 302 includes the dynamic ventilation module 316. The dynamic ventilation module 316 can be configured to coordinate with one or more of the operators 312 associated with the fenestration units 102 to open and close the panels to initiate and control ventilation according to the ventilation prescriptions stored or input to the ventilation prescription module 314.

In another example, the ventilation modulation controller 302 includes a coordination module 318. The coordination module 318 can be configured to receive information about one or more characteristics of the fenestration units 102, for instance, detected open and closed conditions, positions of the respective panels (e.g., closed, open or intermediate positions, etc.). The coordination module 318, in one example, cooperates with the ventilation prescription module 314 and the dynamic ventilation module 316 to coordinate opening of one or more of the fenestration units 102 while another fenestration unit 102 associated with the system is open. For instance, as shown in FIG. 2, one or more sensor assemblies, such as the interior sensor assemblies 206, can be associated with each of the fenestration units 102 including, but not limited to, a door or window. In one example, the ventilation-modulating fenestration system 300 (e.g., as a component of the building services system 200) is configured to operate one or more additional fenestration units, for instance, the fenestration unit 102 associated with the building upper portion 104, such as a skylight, in coordination with opening of one of the windows or doors of the building 100 (e.g., another fenestration unit 102). For instance, if a sash of a particular window fenestration unit 102 is opened, then the coordination module 318 can receive the status indicator from the corresponding interior sensor assembly 206 associated with that particular window fenestration unit and can coordinate operation of one of the other fenestration units 102 of the system. For instance, the panel of a skylight fenestration unit, such as the skylight in FIG. 2, can be opened to facilitate ventilation through the building 100, for instance to encourage a draft between or among the various open fenestration units 102.

In an example, the ventilation-modulating fenestration system 300 includes environment sensors 306 and an environmental system 310. Referring again to the example of FIG. 2, environmental systems 310 can include, but are not limited to, one or more environment conditioning units 212. Optionally, the ventilation modulation controller 302 coordinates the operation of one or more of the environmental systems 310 with one or more of the fenestration units 102 such as in a manner similar to coordination between operation or opening of the fenestration units 102. For instance, on a warm day, an environment conditioning unit 212 such as an air conditioner or dehumidifier can be controlled by the coordination module 318. The coordination module 318 accordingly can operate a fenestration unit 102, such as one that is associated with the building upper portion 104 of the building 100 (e.g., a skylight). In this example, operation of the fenestration unit, for instance using a corresponding operator 312, is automatically controlled by the coordination module 318 in correspondence with operation of the air conditioner. Accordingly, as cool air is delivered to the indoor environment of the building 100, the fenestration unit 102 can be opened using the operator 312 to help exhaust hot air. Conversely, with cessation of operation (e.g., a second operational status, for instance including a blower shut off or the like) the coordination module 318 optionally initiates closing of the fenestration unit 102 using the operator 312, for instance to prevent escape of cooler air. In another example, the fenestration unit 102 can be left open to facilitate additional exhaust of other warm air or to encourage air exchange with the outdoor environment.

In an example, the ventilation-modulating fenestration system 300 includes one or more environment sensors 306. The environment sensors 306 can include, but are not limited to, one or more sensors configured to measure, determine or sense air temperature or object temperature, air quality, moisture (e.g., precipitation), humidity, dew point, one or more wind characteristics such as wind speed, wind direction or the like. As shown in FIG. 3, the environment sensors 306 can include one or more of a temperature sensor 320, an air quality sensor 322, a moisture sensor 324, or an anemometer 326 configured to measure or sense wind speed or wind direction, among other sensors. The air quality sensor 322 can be configured to measure a concentration of one or more particulate types or gas types (e.g., in parts per million), contaminants, or the like, in the air such as the air surrounding the building 100 or in an indoor environment of the building 100. The moisture sensor 324 can be configured to measure one or more of interior or exterior humidity, dew point, precipitation or the like. Optionally, the moisture sensor 324 is, in one example, associated with an interior portion of the building and accordingly determines water ingress or humidity of the indoor environment. Optionally, the ventilation-modulating fenestration system 300 can be configured to determine a humidity difference between the outdoor and indoor environments and, in response, encourage ventilation by opening of one or more of the fenestration units 102.

The bus 304 can comprise a wired or wireless interface that connects each of the various components of the ventilation-modulating fenestration system 300. In an example, the interface comprises a network that can be used to communicate commands between the various controller, interface, and other assemblies of FIG. 3. For example, the interface can include the internet or other LAN or WAN. In an example, the ventilation-modulating fenestration system 300 or controllers therein can comprise a cloud-based or remote service or server that is coupled to the other components of the system.

In an example, the bus 304 includes a hardwired connection between the one or more components including, for instance, Ethernet, coaxial, or other physical connections between each of the one or more components. In such an example, cables can be extended to each of the fenestration units 102 or operators 312 thereof, to the ventilation modulation controller 302, to the operator interface 308, and to the environment sensors 306. The environment sensors 306 can optionally be associated with one or more of the fenestration units 102 or one or more other components of the ventilation-modulating fenestration system 300. In some examples, the sensors can be located remotely relative to the remainder of the system and can include a weather service or other remote sensors or data sources.

In an example, the environment sensors 306 can include sensors configured to determine a position of each of the fenestration units 102. The operator interface 308 can be configured to alert a user when the units are not in a particular desired position. In an example, the alert can be an audible alert broadcast in the environment, or can be an electronic notification, such as an SMS message provided to a user's mobile device. In an example, SMS messaging (or email or other similar electronic message delivery service) can be similarly used to deliver environmental notifications, or to notify a user when one or more automated responses are initiated by the system.

In another example, components of the ventilation-modulating fenestration system 300 can be wirelessly connected, for example, using any one or more of WiFi, Bluetooth, ultrasound, or other nearfield, infrared, radio frequency (RF), or other communication means or protocols, such as using the system interface 210. The system interface 210 can wirelessly interconnect each of the components to facilitate their communication and control of one or more of the system components including, but not limited to, the fenestration units 102, the environmental systems 310, or the like.

In an example, the ventilation-modulating fenestration system 300 comprises a portion of a building automation system that can include or use one or more of the fenestration units 102 or other automatically controlled, environment condition-modulating device or devices. Generally, such an automation system can be configured to receive user input (e.g., via a mobile application or other interface, such as the operator interface 208), receive other data (e.g., via various means of data acquisition from third parties, such as using the internet) such as weather data or other indoor or outdoor environmental condition information, and can receive data or other information from the one or more fenestration units. The system can include one or more processors, located locally or remotely, configured to implement a fenestration control algorithm by processing the various received data in view of the user inputs and various user preferences to achieve particular health, comfort, or energy usage goals, such as through fenestration unit automation.

The system can be connected with third party devices or systems that include, among others, security systems, smart devices such as Alexa™ or other home control or home automation devices or hubs, HVAC devices or controllers, smart appliances, automated window treatments such as shades, or others. In an example, the system can include or comprise a portion of a Building Management System (BMS), such as can be configured to control one or more aspects of a commercial or industrial facility. In an example, the system can be configured to serve all or a portion of a communal living area such as an apartment building, nursing home, hospital, or other facility.

Figure 4:
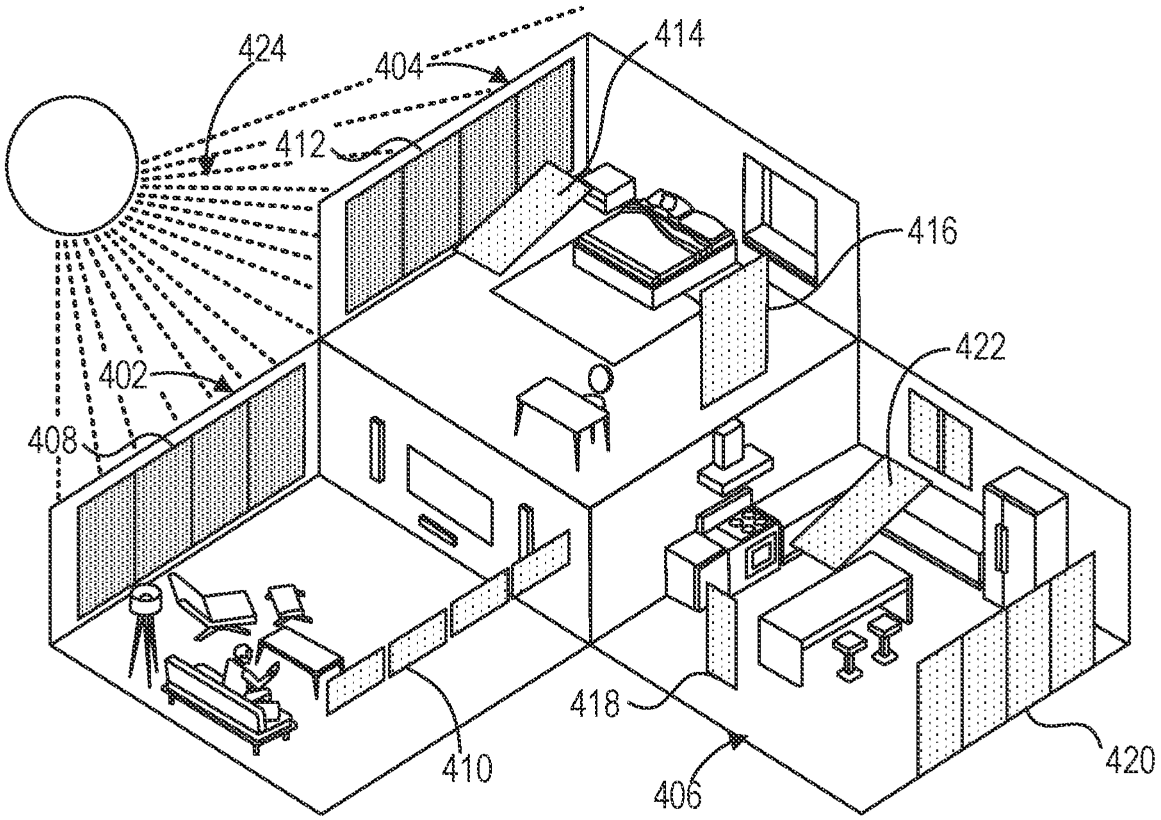
FIG. 4 illustrates generally a pictorial first example of various indoor environments, such as can comprise an interior portion of a building.

FIG. 4 illustrates generally a first example of various indoor environments, such as can comprise an interior portion of the building 100. In the example of FIG. 4, each of the indoor environments can comprise one or more remotely actuated fenestration units. The indoor environments can be discrete and separate areas or can be connected (e.g., can share airspace). One or more of the fenestration units can be controlled using a controller, such as a centralized controller for the building 100, such as can include the ventilation-modulating fenestration system 300 (or a portion thereof) configured to execute a fenestration control algorithm to control opening or closing of one or more of the fenestration units. In an example, one or more of the fenestration units under the control or direction of the fenestration control algorithm can be configured to tint or change opacity or transmissivity, or other automated shading corresponding to one or more units can be controlled.

The indoor environments in the example of FIG. 4 include a parlor environment 402, a bedroom environment 404, and a kitchen environment 406. Each of the environments includes or is served by respective fenestration units or groups of fenestration units. In an example, a group of fenestration units includes multiple units that can be automatically or remotely controlled together. Groups of fenestration units can optionally be set or configured by users.

In the example of FIG. 4, the parlor environment 402 includes a first group 408 and a second group of fenestration units. The units can be disposed on opposite building walls 106. For example, the first group 408 can comprise one or more units disposed on a west-facing wall and the second group 410 can comprise one or more units disposed on an east-facing wall of the parlor environment 402. The bedroom environment 404 includes a third group 412 of fenestration units, a first skylight 414, and a first casement window 416. The kitchen environment 406 includes a second casement window 418, a fourth group 420 of fenestration units, and a second skylight 422. Any one or more of the fenestration units, skylights, or casement windows in the parlor environment 402, the bedroom environment 404, or the kitchen environment 406 can be configured to be automatically and remotely actuated to open or close. In some examples, actuation or control of multiple units (or groups of units) can be coordinated or performed together.

In an example, the fenestration units can be controlled to allow for airflow or air exchange with outdoor air, such as during periods of pleasant weather. Conditions deemed to be pleasant can include those defined by a particular user or occupant of the controlled environment area, or as detected by one or more of the environment sensors 306 according to threshold conditions (e.g., high/low thresholds for environmental characteristics such as temperature, humidity, air quality or allergen concentration, etc.). In an example, airflow can be modulated by opening or closing one or more of the fenestration units 102 based on data about the outdoor environment that is determined using local sensors or using data from, e.g., a third party weather data provider or other environmental data source. In other words, the system and fenestration control algorithm can be used to balance indoor environment preferences from one or more individuals with the natural or present conditions of the outdoor environment to create an optimized atmosphere for the indoor environment.

In some examples, exterior and interior (i.e., outdoor and indoor) atmospheric conditions are compared. Depending on variations in one or more conditions and characteristics (e.g., outdoor and indoor temperature, humidity, air quality or the like), the system can be configured to selectively open or close one or more fenestration units to promote or inhibit environmental control, such as temperature control, ventilation control, air quality control or the like, through air exchange or inhibition of air exchange.

In an example, one or more of the fenestration units can be controlled based on a detected presence or absence of a particular user in the particular environment or room. That is, a preference of a particular user can be known and can be used by the system to control operation of one or more of the fenestration units, such as in coordination with information about the outdoor environment weather or other environmental conditions, and in coordination with health, comfort, or energy usage goals defined by the user or defined for the system. In an example, the system can further include or use security preferences or settings to determine when or whether to control one or more aspects of the system.

Referring again to the example of FIG. 4, fenestration units in a line of direct sunlight 424 can be selectively and automatically tinted, or shades corresponding to such units can be automatically closed, such as to reduce exposure of the indoor environment to solar energy. For example, the fenestration units comprising the first group 408 and the third group 412 of units can be controlled or configured to increase their opacity and reduce solar radiation transmissivity when the direct sunlight 424 is detected, e.g., using one of the environment sensors 306 or using other weather or environment data from an external source. Similarly, fenestration units in a line of direct sunlight 424 can be selectively and automatically de-tinted, or shades corresponding to such units can be automatically opened, such as to admit more solar energy. For example, the fenestration units comprising the first group 408 and the third group 412 of units can be controlled or configured to decrease their opacity and thereby increase solar radiation transmissivity when the direct sunlight 424 is detected, e.g., using one of the environment sensors 306 or using other weather or environment data from an external source.

Figure 5:
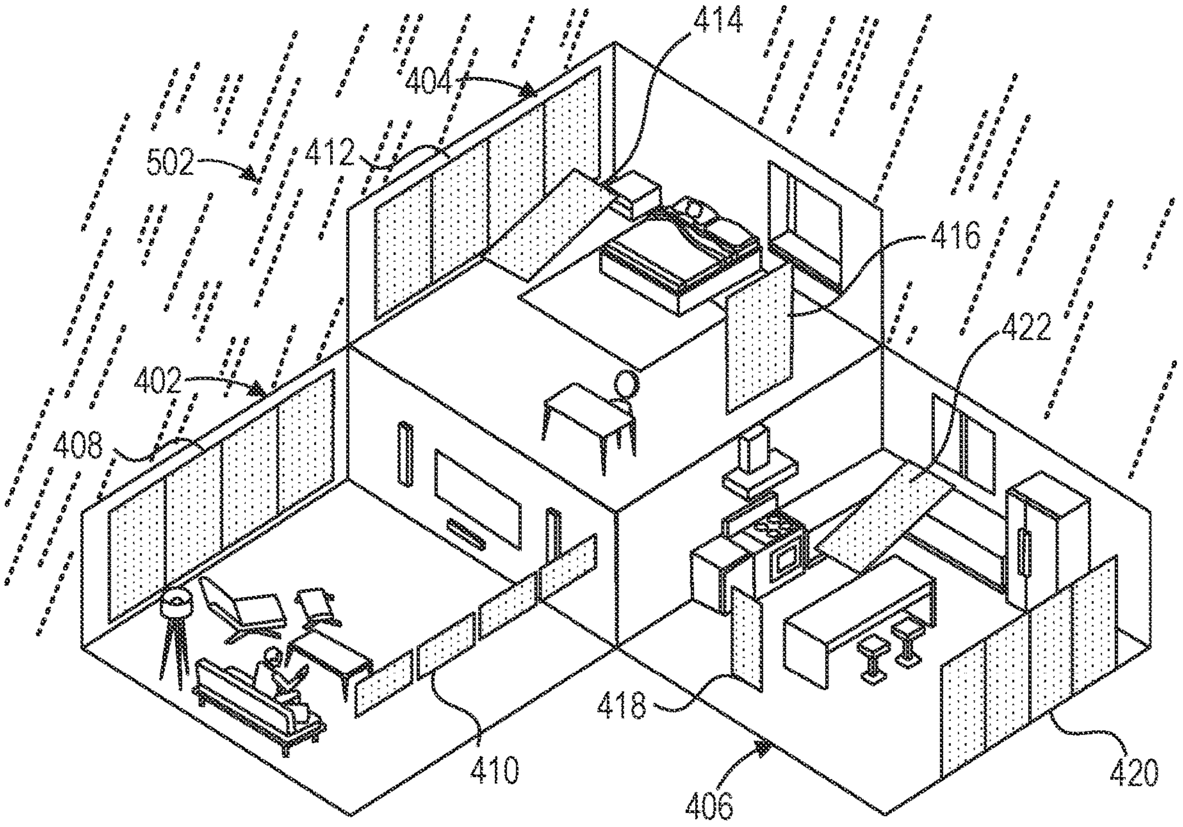
FIG. 5 illustrates generally a pictorial second example of various indoor environments, such as can comprise an interior portion of a building.

FIG. 5 illustrates generally a second example of the indoor environments including the parlor environment 402, the bedroom environment 404, and the kitchen environment 406. In the example of FIG. 5, inclement weather 502 is present at or in the vicinity of the environments. In the example of FIG. 5, the first group 408 and the third group

412 of fenestration units can optionally be de-tinted in response to an absence of the direct sunlight 424, and all of the fenestration units serving the various indoor environments can be closed, such as upon detection of the inclement weather 502. The inclement weather 502 can include atmospheric conditions such as wind, rain, snow, relatively high or low humidity, or the like, that could adversely affect the comfort or safety of an occupant of the environments.

In an example, a user interface can notify an occupant or user of the inclement weather 502 and provide a notification of mitigation measures that are recommended or that are performed automatically by the system, such as including closing one or multiple fenestration units to prevent ingress of precipitation, humidity, or other undesirable conditions. Such notifications can be particularly useful for indoor environments that are served by automated fenestration units and manually-operated units because an occupant or user can be prompted to take action (i.e., to manually close certain units) to prevent damage or discomfort.

Figure 6:
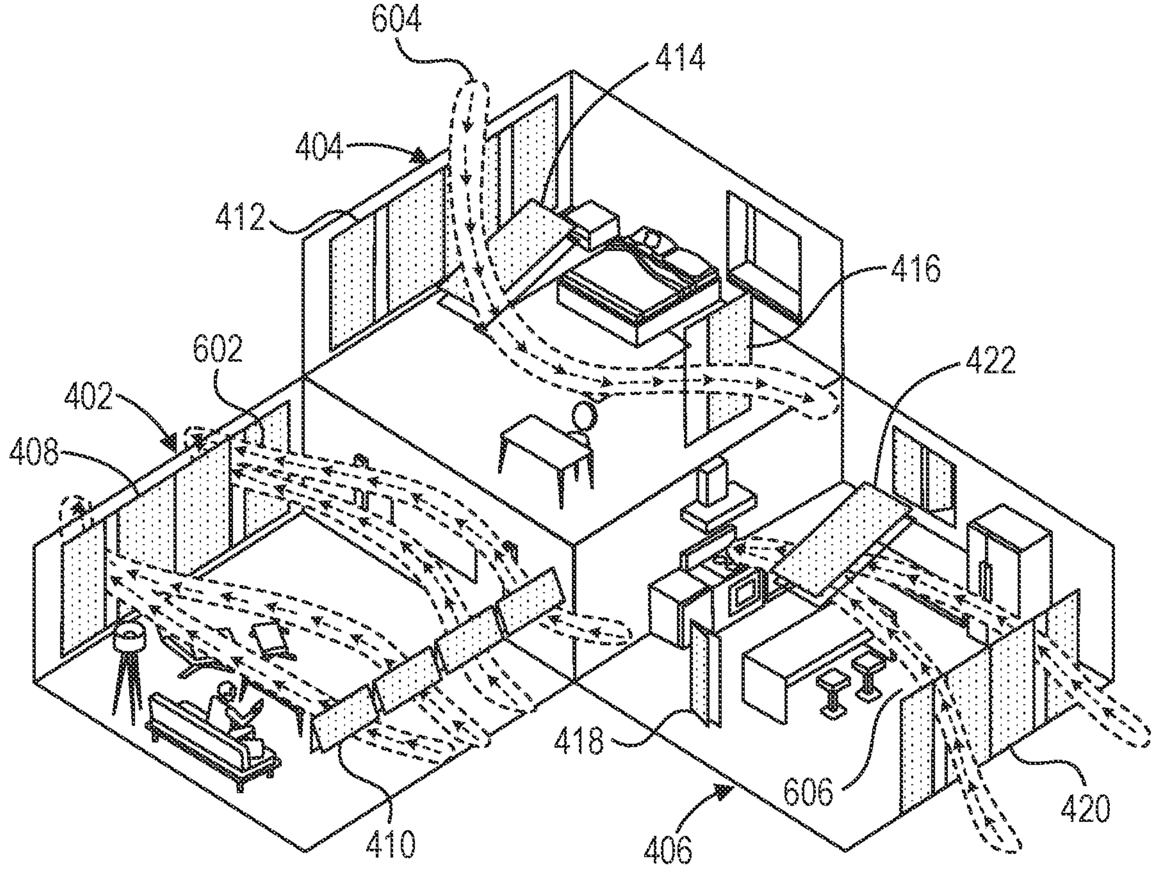
FIG. 6 illustrates generally a pictorial third example of various indoor environments, such as can comprise an interior portion of a building.

FIG. 6 illustrates generally a third example of the indoor environments including the parlor environment 402, the bedroom environment 404, and the kitchen environment 406. In the example of FIG. 5, inclement weather 502 is absent, and one or multiple fenestration units serving the various environments can be automatically opened or closed to help introduce fresh outdoor air into one or more of the indoor environments. That is, the fenestration units including windows, groups of windows, and skylights, can be individually and automatically controlled, such as to encourage or coordinate airflow through one or more indoor spaces.

For example, one or more fenestration units of the first group 408 of windows can be opened (i.e., controlled or actuated to open using corresponding one or more operators 312 of such units), such as by sliding a glazing to expose a first side of the indoor parlor environment 402 to the adjacent outdoor environment. One or more fenestration units of the second group 410 of windows can be correspondingly opened, such as by tilting a glazing to expose an opposite second side of the indoor parlor environment 402 to the outdoor environment. With windows of the first group 408 and second group 410 open, a parlor airflow 602 can be established through the parlor environment 402, thereby introducing outdoor air to the parlor environment 402.

Similarly to the parlor environment 402, the first skylight 414 and the first casement window 416 can be automatically opened to allow a bedroom airflow 604 in the bedroom environment 404. In the kitchen environment 406, the second casement window 418, one or more windows of the fourth group 420 of windows, and the second skylight 422 can be opened to allow a kitchen airflow 606. In an example, different combinations or groups of individual windows of the various indoor environments can be selectively opened or closed to help modulate an amount of airflow in the corresponding indoor environment, such as to help control whether and to what extent the indoor environment experiences atmospheric changes due to the introduction of outdoor air. For example, some fenestration units can be opened minimally when outside temperatures are low (e.g., temperatures are below a low-temperature comfort threshold) or high (e.g., temperatures are above a high-temperature comfort threshold), such as to allow for introduction of a trickle of fresh air to the indoor environment without causing a large or significant temperature change in the indoor environment that would compromise or affect occupant comfort.

In an example, one or more of the fenestration units can be controlled according to time-of-day information. For example, to encourage healthful and restorative sleep, one or more of the units in the bedroom environment 404 can be controlled to ensure airflow to remove excess carbon dioxide and refresh the bedroom environment 404 with outdoor air while an occupant sleeps. In an example, some fenestration units can be opened at nighttime while others can be shut or locked, such as to encourage healthful airflow yet maintain security. For example, the first skylight 414 and the second skylight 422 can be opened at nighttime to encourage air refresh in the bedroom environment 404 and the kitchen environment 406, while other windows serving the same environments can be closed or locked for security. During daytime hours, the fenestration control algorithm can be programmed or biased toward maximizing opportunities to introduce fresh air or the direct sunlight 424 into the indoor environments to help encourage occupant health. For example, the algorithm can be configured to control fenestration units and shading to admit natural light to areas where increased focus or creativity are desired, such as in a workspace during particular designated hours. In some examples, the system can be configured to detect sunlight and cloud coverage and apply automatic tinting to reduce indoor glare, or to reduce reliance on heating or cooling to maintain target temperatures.

In some examples, a fenestration unit (including, without limitation, a skylight, double hung, casement window, door, or the like) can include integrated lighting, shades or the like configured to monitor or mimic natural light patterns to support an inhabitant's natural circadian rhythm. The fenestration control algorithm can coordinate with circadian rhythm information for one or more occupants of the indoor environments, and can monitor and dynamically adjust to changing conditions in the surrounding environment.

The present inventors have recognized that heat or energy transfer to or from an indoor environment can be quantified or modeled and used to control one or more environment conditioning systems (e.g., a heating system, cooling system, air exchange system, or the like). The building services system 200 and fenestration control algorithm can be configured to coordinate and control heat or energy transfer to or from an environment, such as to or from one or more indoor environments of the building 100.

Figure 7:
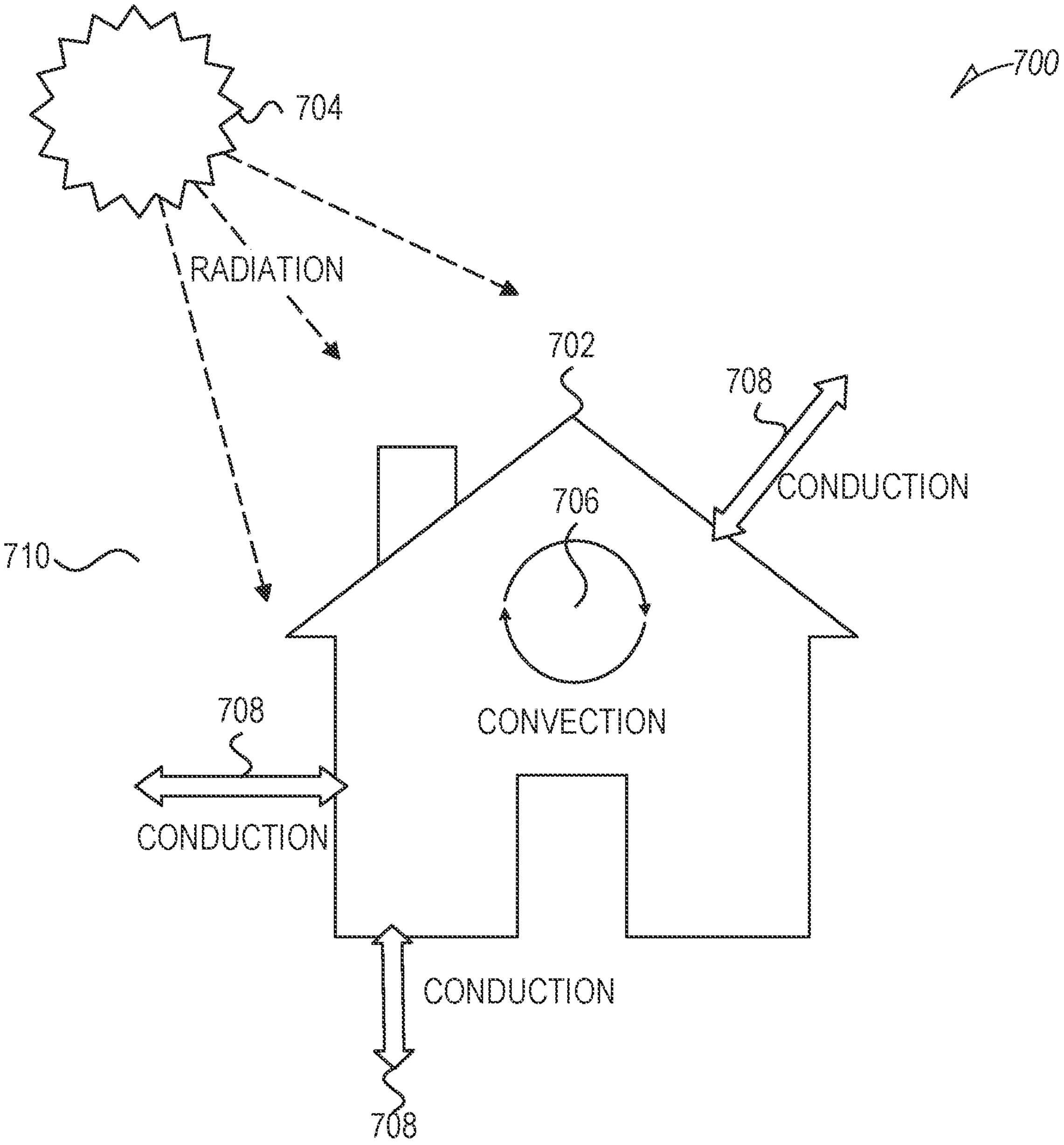
FIG. 7 illustrates generally an energy transfer example.

FIG. 7 illustrates generally an energy transfer example 700. The energy transfer example 700 illustrates various energy transfer mechanisms between an indoor environment 702 and an outdoor environment 710 that is adjacent to, but separated from, the indoor environment 702 such as by one or more walls or other physical boundaries. For example, radiation or solar energy from the sun 704 (e.g., in the form of sunlight), conduction 708, and convection 706 can each contribute to an energy transfer to, from, or within the indoor environment 702. Due at least in part to these and other sources of energy transfer, opening or closing fenestration units may be insufficient or inadequate to fully moderate or control indoor environmental conditions. That is, to maintain a "comfortable" atmosphere in the indoor environment 702, it can be important to account for factors other than a difference between indoor and outdoor air temperatures, or factors other than an air temperature difference between indoor and outdoor environments.

In an example, radiation energy from the sun 704 can impinge on the external surfaces or walls of the indoor environment 702 or can be transmitted through the walls or fenestration units to thereby transfer energy to the indoor environment 702. The indoor environment 702 can experience heat gain in response to receiving the radiation energy. The amount of heat gain in response to different amounts of radiation energy can depend on multiple factors such as sun angle, number and orientation of windows, building materials that comprise the walls or roof of the indoor environment 702, a thermal mass or heat capacity of the building, building components, or objects that comprise the indoor environment 702, or other factors. An amount of energy (e.g., solar radiation energy or other energy) transferred to and retained by the indoor environment 702 is referred to herein as accumulated energy, and information about the amount of accumulated energy can be used as an input to the fenestration control algorithm. In an example, energy accumulated during daytime hours (e.g., via solar radiation) can dissipate during nighttime hours, and accordingly the amount of accumulated energy and its effect on the fenestration control algorithm can change over time.

Some energy can be exchanged with the indoor environment 702 via conduction 708. That is, heat conduction can cause transmission of heat energy through building components such as walls, floors, windows, or other components. In an example, heat transfer via conduction 708 can include heat loss from air exchange through intentional ventilation or unintentional drafts (infiltration). Some energy can be exchanged in or with the indoor environment 702 via convection 706. Internal heat sources such as occupants (e.g., people, pets, etc.), energy-consuming devices (e.g., lights, electronic devices, HVAC devices, cooking or other appliances, etc.) can emit heat that can influence a total energy of the indoor environment 702 and the atmospheric conditions inside.

Not all energy exchange factors are equally weighted. That is, some factors may contribute more than others to energy gains or losses. Some factors that contribute to environment energy gains or losses include (1) geographic location (e.g., latitude and longitude, or other aspects or features that are based on or derived from physical features of an area), (2) shade or tree cover (e.g., expressed in terms of a percentage of shading at each of multiple times of day and/or during multiple different seasons), (3) building construction type (e.g., insulation quality and quantity, age), (4) infiltration, air circulation, or air change per hour (ACH) estimate (e.g., unassisted ACH), (5) location, angle, and size of fenestration units or windows, on one or multiple sides of the environment, and hours of exposure to sunlight, (6) footprint square footage of the environment, (7) indoor air volume of the environment, and (8) any other heat sink or heat source present in the environment, among other parameters.

Some organizations provide standards that can specify or define parameters of a "comfort zone" such as under American Society of Heating, Refrigerating and Air-Conditioning Engineers (ASHRAE) Standard 61.2-2019. This ASHRAE standard specifies a "comfort zone" representing an optimal range and combination of thermal factors (e.g., air temperature, radiant temperature, air velocity, humidity) and personal or experiential factors (e.g., clothing, physical activity level) with which at least 80% of environment or building occupants are expected to express satisfaction.

The present inventors have recognized that information collected about a home (or other indoor environment 702) can be used to calculate expected thermal gains and losses (e.g., during a particular season or throughout a year) and in various weather conditions. In some examples, the data collection and analysis can approximate a value or values for a given environment, similarly to the ASHRAE Cooling Load Temperature Difference/Solar Cooling Load/Cooling Load Factor (CLTD/SCL/CLF) load estimation method, such as can be used to help determine the capacity of HVAC systems.

In an example, the present systems and methods are configured to track solar loading and to identify opportunities for fenestration units to open (e.g., automatically, using the building services system 200) to moderate solar heating, e.g., due to solar radiation. In some examples, the systems and methods discussed herein can be coordinated to accomplish other health or safety-related goals or targets, such as allowing for a minimum number of air changes per unit time interval, such as air changes per hour (ACH), reducing exposure to allergens, or increasing exposure of a particular indoor environment to sunlight.

In an example, a solar loading offset can be used in energy calculations for fenestration unit control. In an example, a solar loading offset can be quantified and assigned a value. A solar loading offset can be based on, e.g., an amount of direct sunlight or shade the indoor environment receives (e.g., account for trees or neighboring structures), an area of windows (or other transmissive surface) exposed to sun on each façade, angle of the sun (e.g., by season), roof style, construction, materials, and orientation of the indoor environment. In the northern hemisphere, while summer sun can be more intense, the angle at which sunlight arrives at windows at midday is generally more oblique than in winter and therefore less solar gain may apply, in some circumstances.

Solar loading can be a function of an environment cooling load through conduction via, e.g., window glass, roofing, walls, or other materials that comprise walls or other boundaries of the indoor environment. In some examples, a solar loading offset can depend on time of day and season. For example, a solar loading offset can represent a difference in temperature between an interior and exterior of an environment at maximum solar load, such as for a particular season and particular time of day. Generally, air conditioning systems are designed to accommodate maximum solar load conditions. An atmospheric response of an indoor environment to maximum solar load can depend on the building construction, orientation, latitude, interior materials, volume of the space and the amount of shade the structure and windows receive, among other factors. In some cases, initial values for some of the variables can be pulled from tables based on the ASHRAE guide and others can be measured or interpolated. In some examples, the values can be fixed or static for a particular environment structure. The values can be fixed for particular times of day and/or seasons, and can be stored in a look-up table.

For example, a heavily shaded cabin in the woods can have a solar loading offset of 0 (e.g., on a scale of 0 to 10) at any given time of day because constant shade can cause an indoor environment of the cabin to include an air temperature that is substantially the same as the outdoor temperature. In contrast, a shed in a parking lot can have a large skylight, framed and insulated walls, and no shading. The shed can have a solar loading offset value of 1 in the morning and a value of 3.5 at mid-afternoon because there can be a lag between when the solar energy enters the shed and the resulting rise in inside air temperature due to the latent heat of the materials and/or items in the shed. Without active cooling on a sunny day, for example, it could be 80° F. outdoors and 115° F. inside the shed.

In an example, an insulation ratio (IR) can be used in energy calculations for fenestration unit control. The IR can be expressed as a value between 0 and 1, where 0 corresponds to better or more highly insulated, and 1 corresponds to no insulation. A rate of change from indoor to outdoor air temperature can be based on an expected R-value average.

In an example, a well-insulated house may have an insulation ratio of 0.015, while an older home may have an insulation ratio of 0.1.

An outdoor sun conditions ratio (SCR) can be used in energy calculations for fenestration unit control. The outdoor sun conditions ratio can be expressed as a value between 0 and 1, where 0 corresponds to nighttime or darkness and 1 corresponds to a clear and cloudless day.

In an example, an airflow capacity or air exchange rate (such as can be expressed in terms of air changes per hour, or ACH) can be used in energy calculations for fenestration unit control. Airflow in an environment can be influenced by opening or closing (e.g., automatically) one or more fenestration units. Fenestration units such as windows or skylights can be opened according to different control stages or amounts of opening. For example, control stage 0 can correspond to a closed fenestration unit, stage 3 can correspond to a fully open fenestration unit, and stages 1 and 2 can correspond to intermediate or partially open units. The control stages can correspond to respective areas of an opening, the location of the fenestration unit in the environment, a difference between indoor and outdoor temperatures, and an actual or expected wind speed, among other factors.

In an example without appreciable wind in the outdoor environment, a number of additional ACH to be achieved can be 0 ACH for control stage 1 and can be 3 ACH for stage 3. In an example with wind, a number of additional ACH can be 0 ACH for control stage 1 and 6 ACH for stage 3. The number of ACH can further depend on speed, direction, and frequency of wind and wind gusts.

Other factors that can be used in energy calculations for fenestration unit control include current or baseline airflow levels, outdoor temperature values, and target temperature values or other target environment conditions (e.g., for an indoor environment, an outdoor environment, or for experiencing outdoor conditions at or in an indoor environment). A target temperature may be greater than or less than a "present" indoor temperature and, accordingly, the systems and methods discussed herein can be similarly used for heating or cooling an indoor environment.

For example, a current airflow level can indicate an amount at which one or more fenestration units is already open and can indicate the actual or estimated ACH. The outdoor temperature value can be expressed as an exterior dry bulb air temperature, or can be expressed as a "feels like" temperature that includes information about humidity to account for latent energy due to moisture in the air.

Opening windows when air temperature is close to, or lower than, a specified comfort temperature can increase convection heat transfer (e.g., heat transfer out of an indoor environment) which in turn can help an interior temperature maintain at a comfortable level, and can increase ACH. The impact on the indoor environment of opening windows can change with windspeed, wind direction, and temperature difference between indoor and outdoor environments.

In an example, opening fenestration units that are exposed to direct sunlight can increase solar gain due to solar radiation, for example, because incoming solar radiation is no longer filtered or refracted by the glass (or other window material). In some examples, such gain can be sufficient to offset losses due to convection.

In a particular example, a low-emissivity ("low-e") window can minimize an amount of infrared and ultraviolet light that is allowed to enter an indoor environment. The window can have a solar heat gain coefficient of, e.g., 0.5-0.6. If direct sunlight transmits 1370 watts/m$^2$ then about 700-800 watts of energy can reach the indoor environment through the low-e window. When the window is open, the full 1370 watts is available to warm the space.

In another example, an ambient air temperature can be 40 degrees Fahrenheit. If, e.g., 10 square feet of full-sun exposure windows are opened in a 400 square foot space, then the ACH is increased by 1 and 600 watts of energy are lost due to increased airflow. In this example, there can be a net gain of 200 watts that maintains the environment within a defined comfort zone.

In an example, an automated window control stage, or amount of opening, can be determined based on environment conditions and a comfort target characteristic for an indoor environment. Each control stage can refer to one window or a particular group of windows to open or close. In an example, each control stage can refer to a particular amount by which to open or close each window, or by which to open each window in a particular group.

In an example, window groups and/or window opening amounts can be statically defined or can be dynamically adjusted. For example, a machine learning system can be used (e.g., over time, such as can include or use data from different times of day, or different seasons) to automatically test different window grouping and opening amount configurations and to monitor or measure the corresponding effects on the indoor environment. Accordingly, window controls can be refined over time as more information is learned about the environment and about a response of the environment to different environmental conditions, such as throughout different seasons.

In a particular example, a comfort target characteristic for an indoor environment can include a target comfort range for one or multiple different environment characteristics, such as temperature, humidity, air quality, or other atmospheric condition. For example, a target characteristic can include a target indoor temperature of 72 degrees (e.g., +/−3 degrees; tolerance or range values can be set or adjusted by a user). The target indoor temperature can include or refer to a "feels like" or "real feel" temperature that accounts for different levels of relative humidity. In some examples, the target characteristic for the indoor environment can be based on a user preference for a particular outdoor environment condition or range of outdoor conditions, for example to provide an outdoor-type comfortable environment in the indoor environment. The comfort target characteristic can further include a preference to maintain fenestration units at a particular control stage (e.g., stage 3) that maximizes the ACH for the indoor environment and thereby maximizes an amount of outdoor air that is introduced to the indoor environment.

Various formulas (e.g., comprising a portion of the fenestration control algorithm) can be applied to determine whether or when to control a fenestration unit to open or close, or to determine a particular control stage to use to attain or maintain a comfort target characteristic for an indoor environment. In an example, the determination can be based on atmospheric status information about the outdoor environment, a solar loading offset for the indoor environment, and a determined difference between the atmospheric status information about the outdoor environment and an environment comfort target characteristic for the indoor environment. That is, a fenestration unit can be automatically controlled to open or close based on a difference between an indoor environment preference or target and atmospheric status information about an outdoor environment, and further based on information about a solar loading offset for the indoor environment, such as to accommodate the effects of solar radiation on, and latent thermal energy of, the indoor environment.

In an example, contributions to environment energy gain and energy loss can be quantified, for example by source, and "balanced" to reach or maintain a comfort target characteristic for an indoor environment (or one or more zones therein). For example, environment energy gain (or heating) sources can include solar radiation, heaters, and other sources such as people and appliances. Environment energy loss (or cooling) sources can include air exchangers, outgoing radiation, heat conduction, and active air conditioning, among others. For purposes of illustration, each source can be assigned a value. The source values can be constant or variable depending on the particular circumstances of the use case. The different sources can be combined in various ways to balance conditions in an environment. For example, if an indoor environment becomes too warm, then active heaters can be turned off, or an air change rate can be increased (e.g., by open one or more fenestration units), or an active cooling system can be activated, among other options.

FIG. 8, FIG. 9, FIG. 10, FIG. 11, and FIG. 12 illustrate generally various pictorial examples of contributions to a first indoor environment of different heat sources and cooling sources, or heat sinks, and options for balancing the sources. For example, FIG. 8 includes first heating units 804 comprising solar heating units, occupant heating units (e.g., heat due to the presence of a person or occupant), and heater units. The example of FIG. 8 includes first cooling units 806 comprising air change units, radiation units, and conduction units. Each unit or block represents a particular amount of heating or cooling. When the number of blocks on each side of a balance point 802 is equal, then the heat sources balance out or equal the cooling sources or heat sinks, and accordingly the first indoor environment can experience substantially zero net heat gain or loss. In other words, the first indoor environment can maintain a substantially unchanging atmosphere because the sum of the first heating units 804 produces about the same among of heat energy as is removed or released by the first cooling units 806. In an example, FIG. 8 can represent initial conditions for the first indoor environment.

Figure 8:
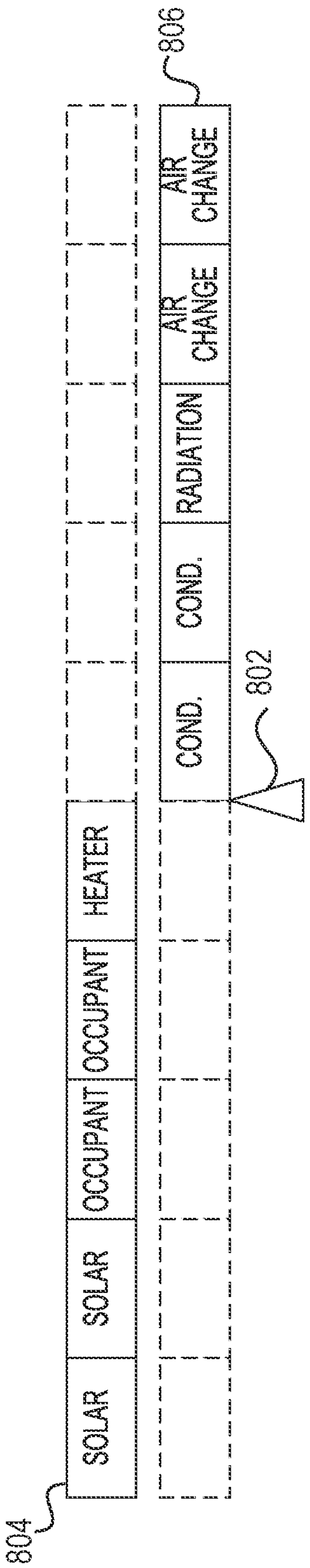
FIG. 8, FIG. 9, FIG. 10, FIG. 11, and FIG. 12 illustrate generally various pictorial examples of contributions to a first indoor environment of different heating sources and cooling sources.
Figure 9:
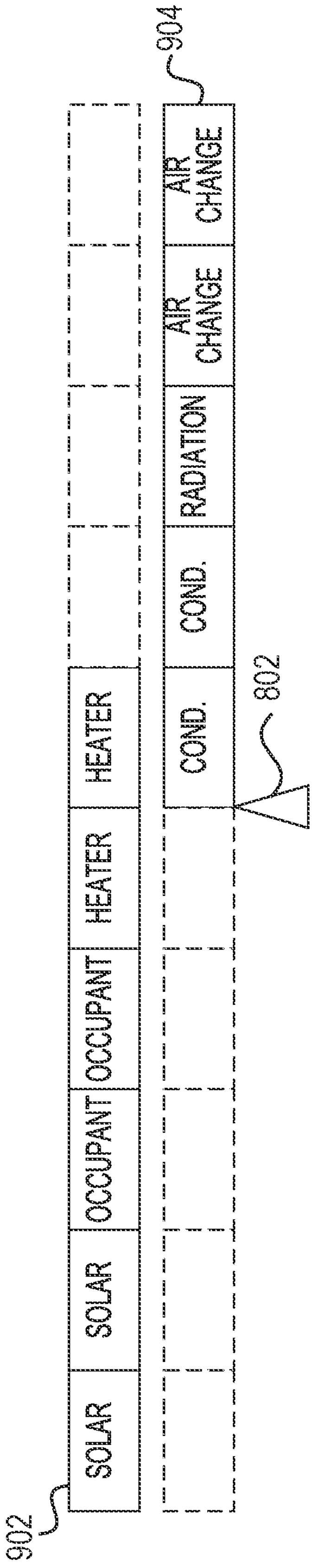

In the example of FIG. 9, second cooling units 904 can comprise the same or substantially the same units as in the example of the first heating units 804 in FIG. 8. However, in the example of FIG. 9, second heating units 902 include the first heating units 804 and an additional heater unit. The heater unit can correspond to, for example, the result of an increase in a setpoint temperature input to a thermostat that controls a furnace for the first indoor environment. Accordingly, the second heating units 902 and the second cooling units 904 do not balance because more heating units are provided than cooling units.

Various approaches can be used to help mitigate the imbalance. In an example, the balance point 802 can be moved and one or more of the second cooling units 904 can be removed, such as to increase the temperature of the first indoor environment and to maintain the increased temperature. In another example, one or more of the second heating units 902 can be removed. For example, a solar heating unit can be removed or mitigated by drawing a shade or tinting a window in the first indoor environment. In another example, an additional cooling unit can be added. For example, a number of air changes per hour can be increased, or an air conditioning unit can be enabled, to help balance the excess heat provided by the second heating units 902.

Figure 10:
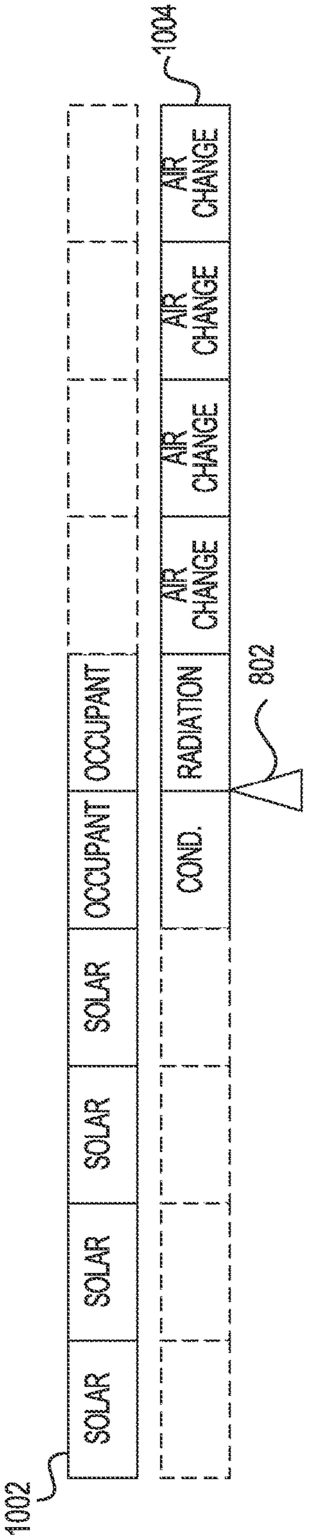

The example of FIG. 10 illustrates generally another example of balancing heating and cooling units for a second indoor environment. In the example of FIG. 10, third heating units 1002 comprise several units of solar radiation and several units indicating a presence of people or occupants in the second indoor environment. In this example, the second indoor environment is not actively heated by a heater, appliance, or other implement. To help maintain the balance point 802, the example of FIG. 10 includes third cooling units 1004 that comprise additional air changes per hour, radiation releasing heat from the second indoor environment, and conduction that conducts heat away from the second indoor environment.

Figure 11:
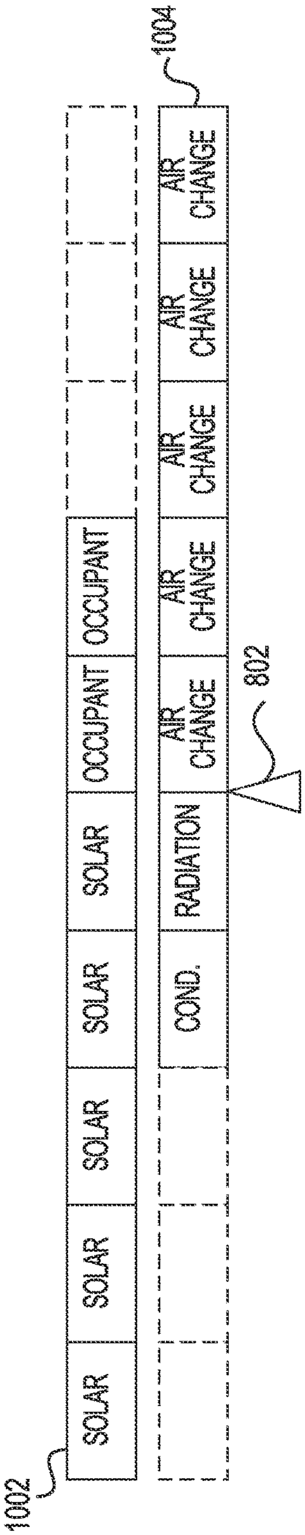

The example of FIG. 11 illustrates the second indoor environment receiving additional solar radiation loading via the fourth heating units 1102. In FIG. 11, a total number of heating units that provide energy to the second indoor environment exceeds the number of heating units comprising the third heating units 1002. To maintain the balance point 802, the system can update or change the third cooling units 1004 to include additional cooling units. For example, the fourth cooling units 1104 can comprise five air change units, one radiation unit, and one conduction unit, to balance the energy exchange in the second indoor environment.

Figure 12:
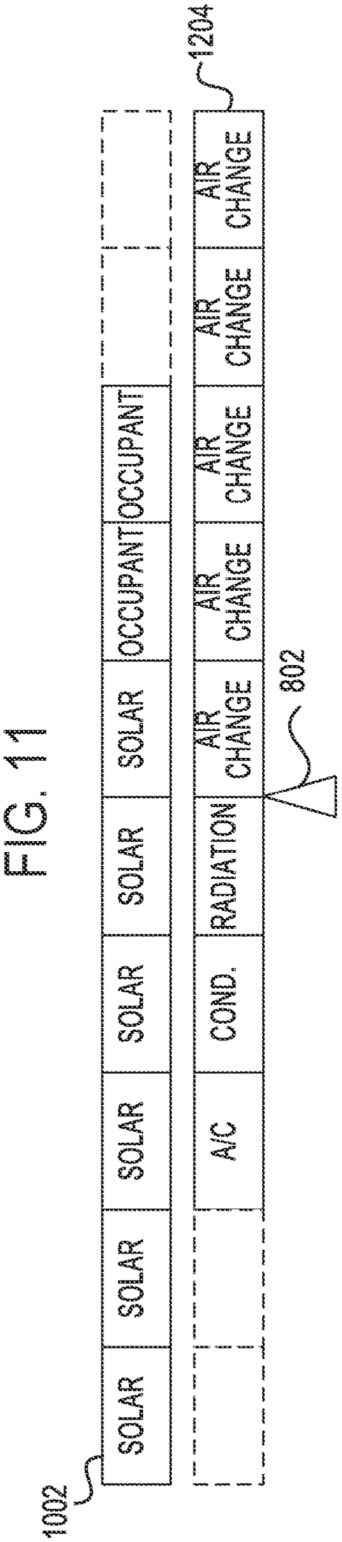

FIG. 12 illustrates generally an example of the second indoor environment with fifth heating units 1202 and fifth cooling units 1204. If solar energy reaching the second indoor environment further increases over the example of FIG. 11, then the system can take further remedial action to help maintain the balance point 802, as in FIG. 12. For example, an air conditioning unit can be used to help remove excess heat from the second indoor environment.

FIG. 12 can represent, for example, the second indoor environment receiving a maximum solar load (e.g., six solar heating units) and maximum occupancy (e.g., two occupant heating units). The example can include a maximum air change (e.g., five cooling units) based on a number of fenestration units that are available to open or based on outdoor environment atmospheric conditions. In this example, the indoor atmosphere or temperature of the second indoor environment cannot be balanced using passive means alone and, accordingly, the air conditioning unit can be used to provide active cooling. In an example, one or more fenestration units that serve the second indoor environment can be automatically closed to help maintain balance and improve efficiency of the active cooling. That is, windows can be automatically closed to allow active cooling to manage the indoor environment temperature.

In an example, passive cooling can be used to achieve or maintain target environment conditions. For example, if a weather forecast includes temperatures that are forecasted to be higher than a target temperature (e.g., 75 degrees), then the system can adjust to accommodate a lower overnight temperature to take advantage of cooler nighttime air temperatures and to pre-cool the indoor environment and structure. In other words, in some examples, an energy imbalance is used intentionally to help pre-cool or pre-heat the indoor environment to thereby counteract expected or forecasted effects on the indoor environment.

In an example, indoor environment airflow can be optimized seasonally. In winter, for example, the system can be configured to open only south-facing windows when heat gains (e.g., due to solar radiation) offset energy losses due to conduction or convection or other air movement.

Figure 13:
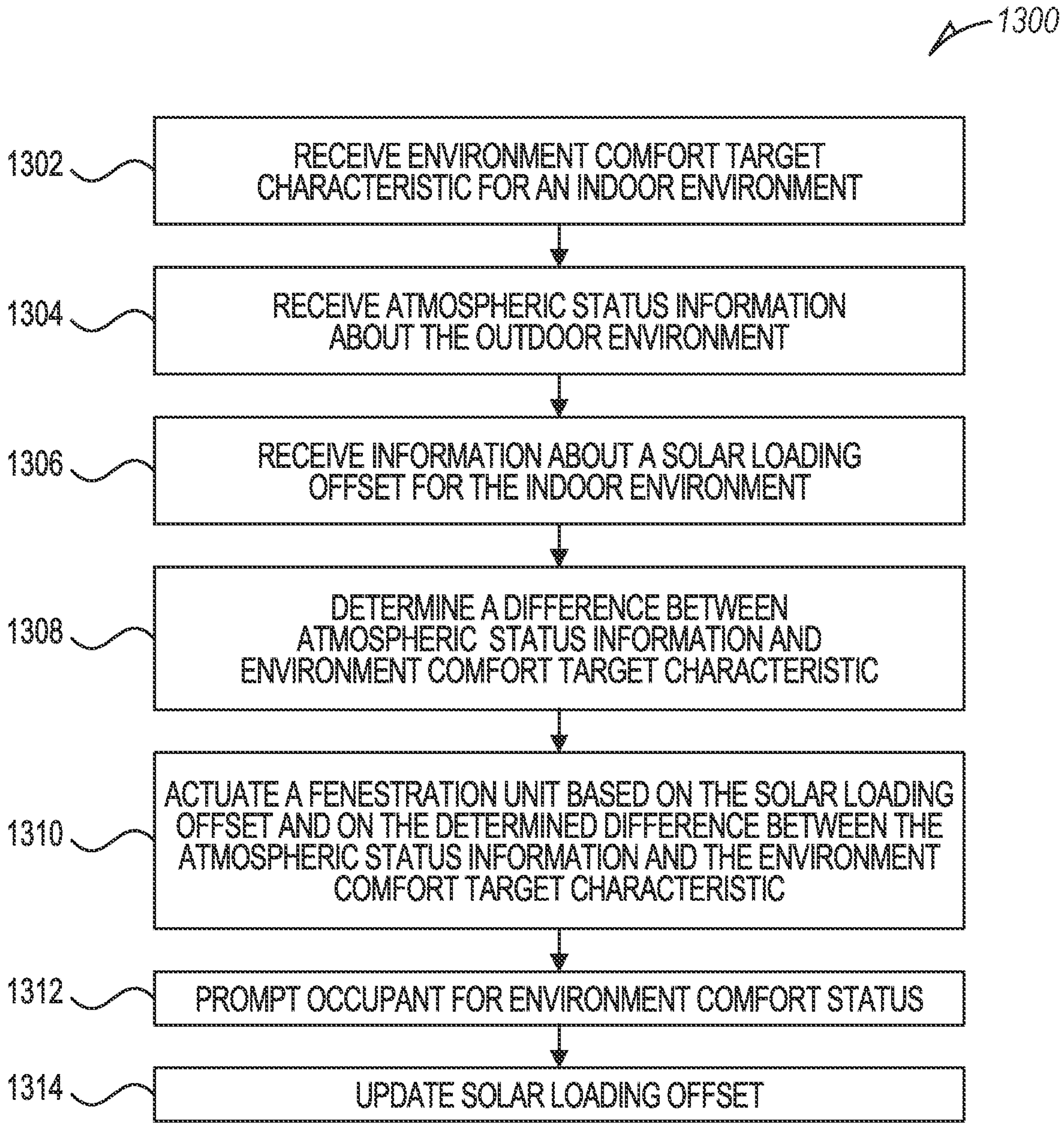
FIG. 13 illustrates generally an example of a fenestration control method.

FIG. 13 illustrates generally an example of a fenestration control method 1300, such as can be used to help attain or maintain an environment comfort target characteristic such as for an indoor environment. The fenestration control method 1300 can include or use information about a solar loading offset for an indoor environment to help determine whether or when to actuate a fenestration unit. In an example, the fenestration control method 1300 can be used to control the fenestration unit 102, such as using one or more aspects of the building services system 200 to perform a fenestration control algorithm. That is, one or more operations of the fenestration control method 1300, or other methods or operations discussed herein, can comprise a portion of the fenestration control algorithm.

At operation 1302, the fenestration control method 1300 can include receiving information about an environment comfort target characteristic for an indoor environment, such as an indoor environment comprising a portion of the building 100. In an example, operation 1302 includes receiving a target characteristic such as a desired temperature, humidity, air quality, or other characteristic, including characteristic ranges, for the indoor environment. In some examples, an environment comfort target characteristic corresponds to a comfortable (e.g., as-provided by an occupant or user) exterior or outdoor temperature, temperature range, humidity, humidity range, or other characteristic or combination of characteristics, that can vary relative to, or can be different than, a target "room temperature" or other interior environment target characteristic. In other words, some embodiments may include or use a particular target characteristic (or group of characteristics) for an indoor environment, such as a set-point characteristic value for an indoor environment. However, various embodiments can additionally or alternatively include or use a target characteristic (e.g., including groups of characteristics, ranges, or the like) that are based on a target characteristic (or group of characteristics) that a user or occupant finds comfortable in an outdoor environment. The fenestration control algorithm can be configured to provide more opportunities for, or duration or frequency of, windows being open (e.g., at least partially open) to help introduce more fresh air and other elements of the outdoor environment and outdoor experience to the indoor environment. In some examples, controlling fenestration unit opening or closing (and moderating the same) based on target characteristics permits admitting comfortable outdoor environment atmospheric conditions into a building, home, or the like (e.g., indoors) to provide a virtual outdoor experience indoors.

Operation 1302 can include receiving the information about the environment comfort target characteristic from an occupant of the indoor environment or from another user, such as using the operator interface 208. In an example, operation 1302 can include receiving information about a target characteristic range, such as can include one or more of a temperature range, a humidity range, an air quality range, or other atmospheric characteristic range.

At operation 1304, the fenestration control method 1300 can include receiving atmospheric status information about the outdoor environment. The outdoor environment can include an area that is adjacent or near to the indoor environment for which the information about the environment comfort target characteristic was received at operation 1302. Operation 1304 can include receiving atmospheric status information such as weather information from local or remote sources. For example, weather data can be received from an external weather data source, such as via the internet.

At operation 1306, the fenestration control method 1300 can include receiving information about a solar loading offset for the indoor environment. The solar loading offset information can be measured using one or more sensors or can be received from a user input, such as an input to the operator interface 208. Various components or contributors to solar loading offset are discussed herein at FIG. 15 and elsewhere.

At operation 1308, the fenestration control method 1300 can include determining a difference between the atmospheric status information about the outdoor environment (e.g., as-received at operation 1304) and the environment comfort target characteristic (e.g., as-received at operation 1302). For example, operation 1308 can include determining a temperature difference between a target temperature (e.g., comprising the environment comfort target characteristic) and a measured temperature of the outdoor environment. Temperature is mentioned as an illustrative example and other environment characteristic or atmospheric parameter information can similarly be used.

In an example, the difference determined at operation 1308 can be based on a difference between particular parameters of the same type or can be based on aggregated parameters. For example, the environment comfort target characteristic can comprise information about temperature, humidity, and/or air quality. The information can be combined to provide an aggregate target characteristic, such as by differently weighting and combining the various component characteristics. Similarly, the atmospheric status information can comprise information about temperature, humidity, and/or air quality for the outdoor environment, and the information can be similarly combined to provide an aggregate atmospheric status characteristic. In this example, the difference determined at operation 1308 can be based on a difference between the aggregate target characteristic and the aggregate atmospheric status characteristic.

At operation 1310, the fenestration control method 1300 can include actuating a fenestration unit (e.g., a unit that is coupled to or otherwise serves the indoor environment). Determining whether to actuate the fenestration unit, or determining an amount by which to move the fenestration unit, can be based on the solar loading offset information received at operation 1306 and on the determined difference from operation 1308 between the atmospheric status information about the outdoor environment and the environment comfort target characteristic. In other words, a control signal configured to control or instruct a fenestration unit to open or close by a specified opening or closing amount can be a function of the solar loading offset, the atmospheric status information, and the environment comfort target characteristic.

In an example, at operation 1312 such as at, during, or in coordination with actuating the fenestration unit at operation 1310, the fenestration control method 1300 can include prompting a user, such as an occupant of the indoor environment, for information about a comfort status of the indoor environment. For example, operation 1312 can include using the operator interface 208 to poll the user or occupant about whether the change in the fenestration unit position provided or resulted in a particular change in the atmosphere of the indoor environment. For example, operation 1312 can include prompting the occupant to confirm whether a perceived temperature of the indoor environment increased or decreased. A response or input from the user or occupant (or information sensed about an occupant behavior, activity, presence, or absence) can be used as feedback for the system, for the fenestration control algorithm, or for a machine learning-based controller, to validate operation of the system. For example, the feedback can be used to validate, or indicate a need for a change or update to, the solar loading offset. If the feedback does not indicate that the environment atmosphere was changed in an expected manner, then the solar loading offset (or other parameter of the algorithm) may need to be changed or updated. At operation 1314, the fenestration control method 1300 can optionally include updating the solar loading offset based on the feedback.

Figure 14:
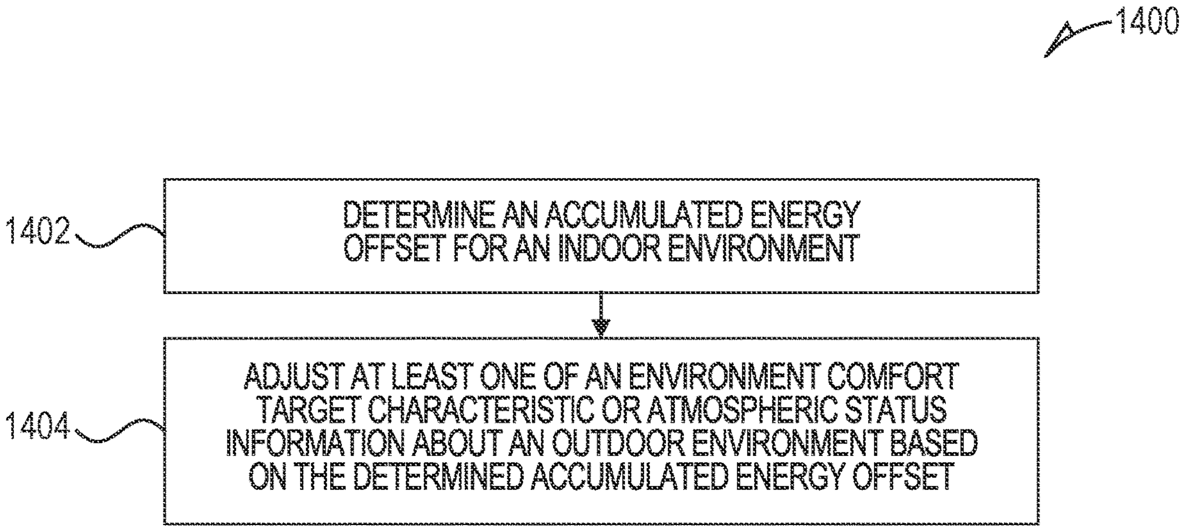
FIG. 14 illustrates generally an accumulated energy offset accommodation method.

FIG. 14 illustrates generally an accumulated energy offset accommodation method 1400. The accumulated energy offset accommodation method 1400 can optionally be used together with the fenestration control method 1300 such as to optimize or tune a system decision to actuate a fenestration unit. Accumulated energy can be expressed in terms of power per unit time and can represent or quantify an amount of energy that is, or can be, absorbed by an indoor environment when windows or other fenestration units are closed, but when shades or tinting or other solar radiation-moderating devices are unused.

At operation 1402, the accumulated energy offset accommodation method 1400 can include determining an accumulated energy offset for an indoor environment. In an example, the accumulated energy offset can represent a residual heat or energy that is stored by the indoor environment. Information about accumulated energy can be used to provide a “feels like” temperature for an environment when a perceived temperature differs from a measured temperature due to various temperature-perturbing characteristics. In other words, accumulated energy can affect a perceived temperature in an indoor environment that differs from an actual temperature of the same environment.

At operation 1404, the accumulated energy offset accommodation method 1400 can include using the determined accumulated energy offset to adjust at least one of an environment comfort target characteristic or an atmospheric status about an outdoor environment. In other words, based on the determined accumulated energy offset, a further offset or adjustment can be made to the environment comfort target characteristic (e.g., as-received at operation 1302) or can be made to the received information about the atmospheric status of the outdoor environment (e.g., as-received at operation 1304). In an example that includes a particular temperature value as the environment comfort target characteristic, the particular temperature value can be reduced when the accumulated energy offset indicates excess residual or retained heat in the indoor environment. The reduced value can be used, for example, at operation 1308 or at operation 1310 to influence whether or when to actuate a particular fenestration unit.

Accumulated energy, such as including residual or retained heat, can dissipate over a period of hours or days. In a particular example, energy accumulated during daytime hours can be dissipated during nighttime hours, and a value or quantity of accumulated energy can change over time. Accordingly, information about changes in the accumulated energy offset can be used to influence operations of the system.

Figure 15:
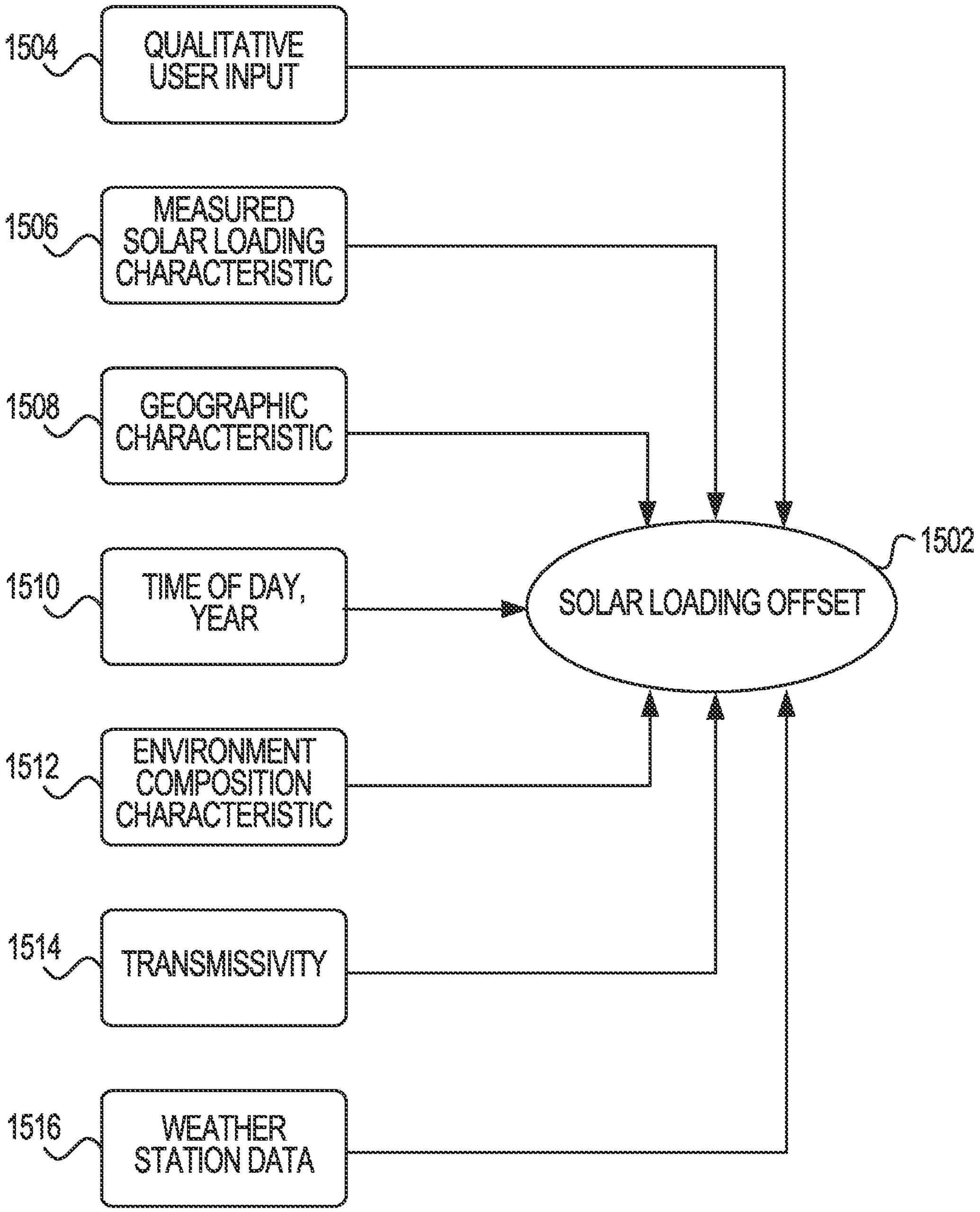
FIG. 15 illustrates generally an example of determining a solar loading offset for an indoor environment.

FIG. 15 illustrates generally an example of determining a solar loading offset 1502. In an example, the fenestration control method 1300, such as at operation 1306, can include or use the solar loading offset 1502. The solar loading offset 1502 can be based on one or more of a qualitative user input 1504, a measured solar loading characteristic 1506, a geographic characteristic 1508 for the indoor environment, a time of day or time of year 1510 during which the fenestration control algorithm is performed, an environment composition characteristic 1512 of the indoor environment or the outdoor environment, a transmissivity 1514 of one or more fenestration units or glazings that serve the indoor environment, weather station data 1516, or other information.

For example, the qualitative user input 1504 can include a user-specified value that quantifies or indicates a perceived solar loading of the indoor environment. In an example, the qualitative user input 1504 includes a numerical value (e.g., on a scale of 0 to 10; other scales can similarly be used) that indicates a user perception about whether, and to what extent, the indoor environment receives or retains energy from solar radiation. The measured solar loading characteristic 1506 can include an objective or quantitative measure of solar loading for the indoor environment. For example, the measured solar loading characteristic 1506 can include information from one or more sensors about an amount of light or solar energy received by the indoor environment and corresponding changes in air or object temperature in the indoor environment.

The geographic characteristic 1508 information can include information that is based on or derived from physical features of an area. For example, geographic characteristic 1508 information can include information about a geographic location of the indoor environment and its susceptibility (e.g., actual or probable) to solar loading. For example, different values for the solar loading offset 1502 can be provided when the geographic characteristic 1508 indicates that the indoor environment is located in an arid desert as compared to a dense forest or city location.

The time of day or time of year 1510 information can influence the solar loading offset 1502 because solar radiation can be expected to affect the indoor environment during only particular hours of a day or only during particular times of year. For example, differently valued solar loading offsets 1502 can be provided during daytime hours and during nighttime hours. Similarly, differently valued solar loading offsets 1502 can be provided during winter months and summer months due to differences in the number of daylight hours and sun angle.

In an example, the solar loading offset 1502 can be considered or used (e.g., exclusively) during particular times of day. For example, the solar loading offset 1502 can be used from about one hour after sunrise until sunset. Solar energy can be diffused or reduced by the atmosphere for a period following sunrise. Furthermore, a first hour or so of solar energy exposure after sunrise can be absorbed by the materials in the indoor environment so the impact of solar loading may not be felt immediately. In some examples, the latent or received heat energy may not be felt or perceived by an occupant until after several hours of solar radiation exposure. Accordingly, the time of day or time of year 1510 information can affect the solar loading offset 1502.

The environment composition characteristic 1512 can include information about materials that comprise the indoor environment or objects in the indoor environment, or can optionally include information about materials that are near the indoor environment and provide a heat island effect for the indoor environment. For example, the environment composition characteristic 1512 can include information about whether and to what extent the building walls 106 of the indoor environment are insulated, or information about a number or type of windows serving the indoor environment (e.g., single or double-pane windows), or information about exterior paint or other material colors, floor or subfloor type, and more. Any of these and other environment composition characteristics 1512 can influence the solar loading offset 1502 because the characteristics can affect heat retention in or by the indoor environment.

The transmissivity 1514 can include information about a solar radiation transmission characteristic by or through fenestration units serving the indoor environment, or side-wall or roof materials that comprise boundaries of the indoor environment. In an example, the transmissivity 1514 includes information about a surface area of glazings or other transmissive surfaces. Some indoor environments with walls or windows that are more transmissive to solar radiation can be more susceptible to solar loading because more solar energy can reach the indoor environment and objects inside the indoor environment.

The weather station data 1516 can include information from a local or remote weather data source. For example, the weather station data 1516 can include information about cloud cover or precipitation that can be used to adjust the solar loading offset 1502. For example, in inclement weather or under cloud cover, less solar radiation may reach the indoor environment because the solar radiation from the sun is diffused or dispersed before it reaches the indoor environment. Accordingly, the solar loading offset 1502 can be updated or adjusted in coordination with changing weather status at or near the indoor environment.

In an example, the fenestration control method 1300 can include the fenestration control algorithm configured to open or close fenestration units while accommodating user or occupant health, safety, and comfort preferences, and optionally accommodating the impact of solar heating on an indoor environment. In an example, the fenestration control method 1300 can be configured or biased to achieve a particular health, safety, or comfort goal. For example, the method can be configured to maximize an amount of time that one or more windows are open (e.g., at least partially open) to thereby maximize opportunities for air exchange between the indoor environment and the outdoors. In another example, the method can be configured to prioritize safety over comfort, and to prioritize comfort over energy use or consumption, and so on. Generally, the fenestration control method 1300 can include or use the solar loading offset 1502 to help optimize system performance.

In an example, the solar loading offset 1502 can be used to determine or quantify an amount of solar energy that impacts the indoor environment. The quantified amount can be used to "correct" or adjust measured indoor or outdoor temperatures to better indicate the perceived effect of such temperatures on an occupant.

Various examples are presented to illustrate use of the solar loading offset 1502 to update or adjust other indoor and outdoor environment characteristics. For example, as similarly explained above, solar loading offset 1502 can be influenced by cloud cover (e.g., as determined from local sensors or weather station data 1516, among other sources). However, even with total or near total cloud cover, there can be sufficient diffused solar radiation to raise a temperature of an indoor environment during the day. The magnitude of such a change in an indoor environment temperature value can depend on factors such as a thickness or type of the clouds. Information about cloud thickness or type of cloud cover may not be a readily available in all areas, so a compromise value (e.g., 25%) can be used. In this example, the value of the solar loading offset 1502 can be reduced according to the cloud cover effect to provide a Reduced Solar Loading Offset. For example, Reduced Solar Loading Offset=Solar Loading Offset*Cloud Cover Reduction.

In the example above, if the compromise value of 25% is used, then the Cloud Cover Reduction value can be 1−[cloud cover compromise value]=1−0.25=0.75. In an example, the cloud cover can be expressed as a percentage that represents an average cloud cover over a specified unit time (e.g., a past 1 hour, or other timeframe). The solar impact for the indoor environment then can be quantified as a function of the Reduced Solar Loading Offset, the Cloud Cover Reduction value, and the cloud cover value. For example, Solar Impact=Reduced Solar Loading Offset−(Cloud Cover Reduction*cloud cover %).

A solar loading-corrected, Calculated Outdoor Temperature can be a function of the actual or measured outdoor temperature and the Solar Impact. The Calculated Outdoor Temperature can, in an example, represent a "feels like" temperature. That is, Calculated Outdoor Temperature=Outdoor Temperature+Solar Impact.

Other factors or variables can be incorporated in the determination of the Reduced Solar Loading Offset, the Solar Impact, or the Calculated Outdoor Temperature to improve accuracy. For example, information about properties of a façade of the indoor environment, such as including a window area, construction, and color information, can be incorporated as further offsets or weights to enhance the accuracy of the outdoor temperature determination.

In another example, the environment comfort target characteristic can include a temperature range of, e.g., 68 to 72 degrees Fahrenheit (F). The measured outdoor environment temperature can be 70 F with 50% cloud coverage and the indoor environment can have a solar loading offset value of 3 (e.g., on a scale of 0 to 10, with 0 indicating no measurable solar loading impact on the indoor environment). In this example, Solar Impact=3−2.25*0.5=1.875, and Calculated Outdoor Temperature=70+1.875=71.9 F.

Accordingly, one or more fenestration units serving the indoor environment can be opened because the perceived or "feels like" temperature in the indoor environment will be about 71.9 F, which is within the target temperature range.

If, in the preceding example, cloud coverage is eliminated (i.e., reduced to 0%), then:

Solar Impact=3−2.25*0.0=3, and

Calculated Outdoor Temperature=70+3=73 F.

Accordingly, one or more fenestration units serving the indoor environment can be closed because the perceived or "feels like" temperature is 73 F, which exceeds the upper limit of the target temperature range. In this example, with fenestration units closed, an air conditioning system can optionally be activated and operated to more efficiently cool the indoor environment.

In another example, the environment comfort target characteristic can include a temperature range of, e.g., 68 to 72 degrees Fahrenheit. The measured outdoor environment temperature can be 66 F with 25% cloud coverage and the indoor environment can have a solar loading offset value of 3. In this example, Solar impact=3−2.25*0.25=2.4, and Calculated Outdoor Temperature=66+2.4=68.4 F.

In this example, even though the measured outdoor environment temperature is less than the lower limit of the target temperature range, the "feels like" temperature is 68.4 F, which is within the target range. Accordingly, one or more fenestration units serving the indoor environment can be opened to allow outdoor air into the indoor environment.

In an example, there can be opportunities for brief window openings even when temperatures are more significantly below a target temperature range (e.g., more than one degree below, more than 10 degrees below, or further below a lower limit of the target temperature range). For example, windows can be opened when accumulated energy in an indoor environment is sufficient to offset losses due to window opening. The function for determining the Calculated Outdoor Temperature can be updated to accommodate or include the influence of accumulated energy in the indoor environment. For example, Calculated Outdoor Temperature=Outdoor Temperature+Solar Impact+Accumulated Energy.

In an example that includes accumulated energy, an outdoor temperature can be 30 F with 0% cloud coverage and an indoor environment solar loading offset of 4. In this example, a furnace serving the environment can provide 60,000 BTU. Heating demand per hour, at maximum, can maintain an indoor environment temperature of 75 F when an overnight minimum temperature is −11 F (corresponding to 17.6 kW of input energy from the furnace).

In this example, an Estimated Heating Demand per hour can be provided as follows:

| Temperature | Outdoor | | | | | | | | |
|---|---|---|---|---|---|---|---|---|---|
| (F.) | −11 | 0 | 10 | 20 | 30 | 40 | 50 | 60 | 70 |
| kW | 17.6 | 15.3 | 13.3 | 11.3 | 9.2 | 7.2 | 5.1 | 3.1 | 1.0 |
| Run Time | 100% | 87% | 76% | 64% | 52% | 41% | 29% | 17% | 6% |

Actual heating demand can vary depending on, for example, construction of the environment and the weather. For example, a leaky home can experience more drafts as the temperature drops due to the stack effect, outside wind can increase a rate of energy loss, etc.

In an example, an energy gain estimate (e.g., in kilowatts) for the indoor environment, accommodating the solar loading offset, can be a function of the maximum demand and solar loading. For example, Energy Gain=(Solar Loading Offset/10)*Maximum Heating Demand.

In this example, an estimated energy gain from solar radiation is 4/10*17.6=7 kW.

On a sunny winter day, with the lowest outdoor temperature that the heating system is designed to accommodate, an environment with a Solar Impact score of 10 would have all (e.g., 100%) of the energy needed (17.6 kW) to maintain an indoor environment temperature of about 72 F-75 F without supplemental heat from the furnace, such as after about 1 hour of exposure to the sun. In contrast, an environment with a Solar Impact score of 1 would have about 10% (1.7 kW) of the required energy, and accordingly a supplemental heating source would be required to maintain the target minimum temperature of 72 F.

In this example, solar radiation is determined to provide about 7 kW of energy to the indoor environment per hour. Accordingly a Solar Warming Impact per hour is 7 kW. Throughout the course of a day, materials that comprise the indoor environment can absorb at least a portion of this energy and return or release the energy (e.g., to the air, occupants, environment objects, etc.).

In this example, the Calculated Outdoor Temperature can be a function of the calculated Accumulated Energy, the measured outdoor temperature, and the solar loading offset. For example, Calculated Outdoor Temperature=Accumulated Energy+30 F+4.

At 30 F, a furnace serving the indoor environment can be expected to run about 50% of the time to provide about 9.2 kW into the environment to maintain at least a minimum target temperature.

In this example, with a Solar Loading Offset of 4, the indoor environment can receive about 7 kW of solar energy. On a sunny day with, e.g., 40 F measured outdoor temperature, the environment can maintain an indoor temperature of about 75 F without running the furnace. The environment can, in an example, recover energy lost, such as due to opening windows or doors, within about an hour after closing. The rate at which the environment cools when windows are open can depend on wind speed, direction, the orientation of the windows, the opening amount, and the internal structure of the home, among other factors. An exact value for the temperature change rate can be difficult to determine, however, it can be assumed that a temperature drop is at least a few degrees within 1 to 2 hours. In some examples, the environment can be expected to remain comfortable with a 1:1 open/close time, and accordingly outdoor air can be allowed in using a 1 hour on, 1 hour off pattern (or 2 on 2 off, 0.5 on 0.5 off, etc.).

Figure 16:
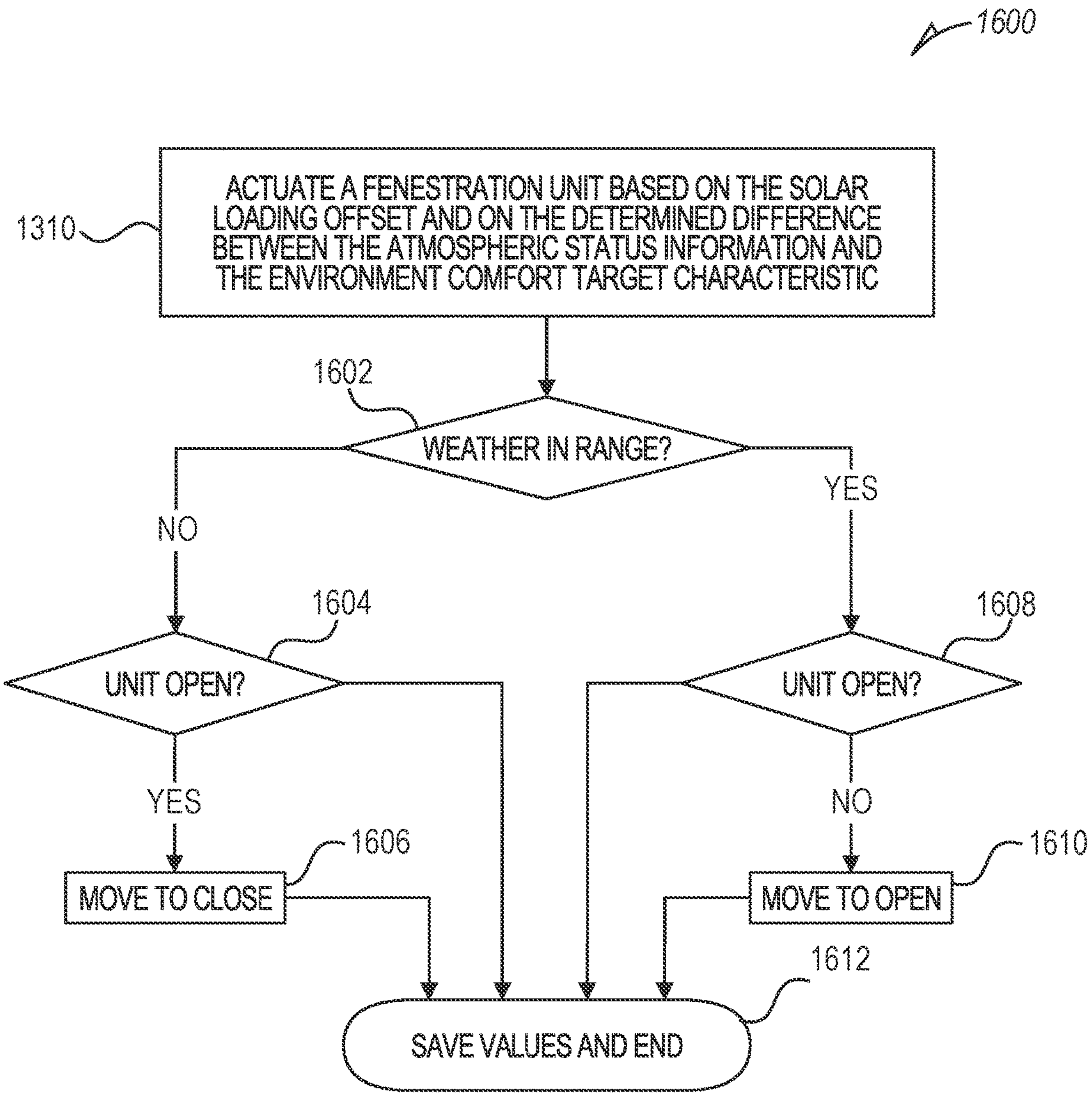
FIG. 16 illustrates generally a weather data processing method for fenestration unit control.

FIG. 16 illustrates generally a weather data processing method 1600 for fenestration unit control, according to various embodiments. In an example, the weather data processing method 1600 can be performed by or using the building services system 200. The weather data processing method 1600 can begin at operation 1310 with actuating a fenestration unit. In an example, operation 1310 can include opening or closing the fenestration unit, such as partially or completely.

Concurrently with actuating the fenestration unit, or at a specified later time, the building services system 200 can receive or obtain weather data, such as including information about outdoor environment conditions at or near an indoor environment served by the actuated fenestration unit. At decision operation 1602, the weather data processing method 1600 can determine if the weather data is within a specified range of weather conditions. For example, decision operation 1602 can include determining the weather data indicates an outdoor temperature that is either within or outside of a specified target temperature range, or determining the weather data indicates an outdoor humidity that is either within or outside of a specified humidity target range, and so on for various other environment characteristics.

If the weather conditions are inside of the range, then the weather data processing method 1600 can continue at decision operation 1608 to determine if the fenestration unit is open or closed. If the weather conditions are outside of the range, then the weather data processing method 1600 can continue at decision operation 1604 to determine if the fenestration unit is open or closed.

At decision operation 1608, if the fenestration unit is closed, then the weather data processing method 1600 can proceed to operation 1610. At operation 1610, the fenestration unit can be actuated or moved to an open (e.g., fully open or partially open) position. For example, because the weather data indicates outdoor environment conditions that are within a specified range (e.g., as-determined at decision operation 1602) and because the fenestration unit is not already open (e.g., as-determined at decision operation 1608), the fenestration unit can be opened to allow fresh outdoor air into the indoor environment. Following operation 1610, the weather data processing method 1600 can terminate or hold for further operations, such as in response to later weather data or other changing conditions in the indoor environment or outdoor environment. If, at decision operation 1608, the fenestration unit is already open, then the weather data processing method 1600 can terminate or hold for further operations.

At decision operation 1604, if the fenestration unit is open, then the weather data processing method 1600 can proceed to operation 1606. At operation 1606, the fenestration unit can be actuated or moved to a closed (e.g., fully closed or partially closed) position. For example, because the weather data indicates outdoor environment conditions that are not within the specified range (e.g., as-determined at decision operation 1602) and because the fenestration unit is already open (e.g., as-determined at decision operation 1604), the fenestration unit can be closed to prevent ingress of outdoor air. Following operation 1606, the weather data processing method 1600 can terminate or hold for further operations, such as in response to later weather data or other changing conditions in the indoor environment or outdoor environment. If, at decision operation 1604, the fenestration unit is already closed, then the weather data processing method 1600 can terminate or hold for further operations.

In an example, determining whether to open or close a fenestration unit, and optionally including determining a control stage to use to maintain a comfort target characteristic, can be based on a calculation of net energy transfer at the indoor environment. For example, the determination can be based on (1) energy gain at an indoor environment, such as due to solar radiation, (2) energy loss from the indoor environment due to conduction, and (3) energy loss from the indoor environment due to convection.

Figure 17:
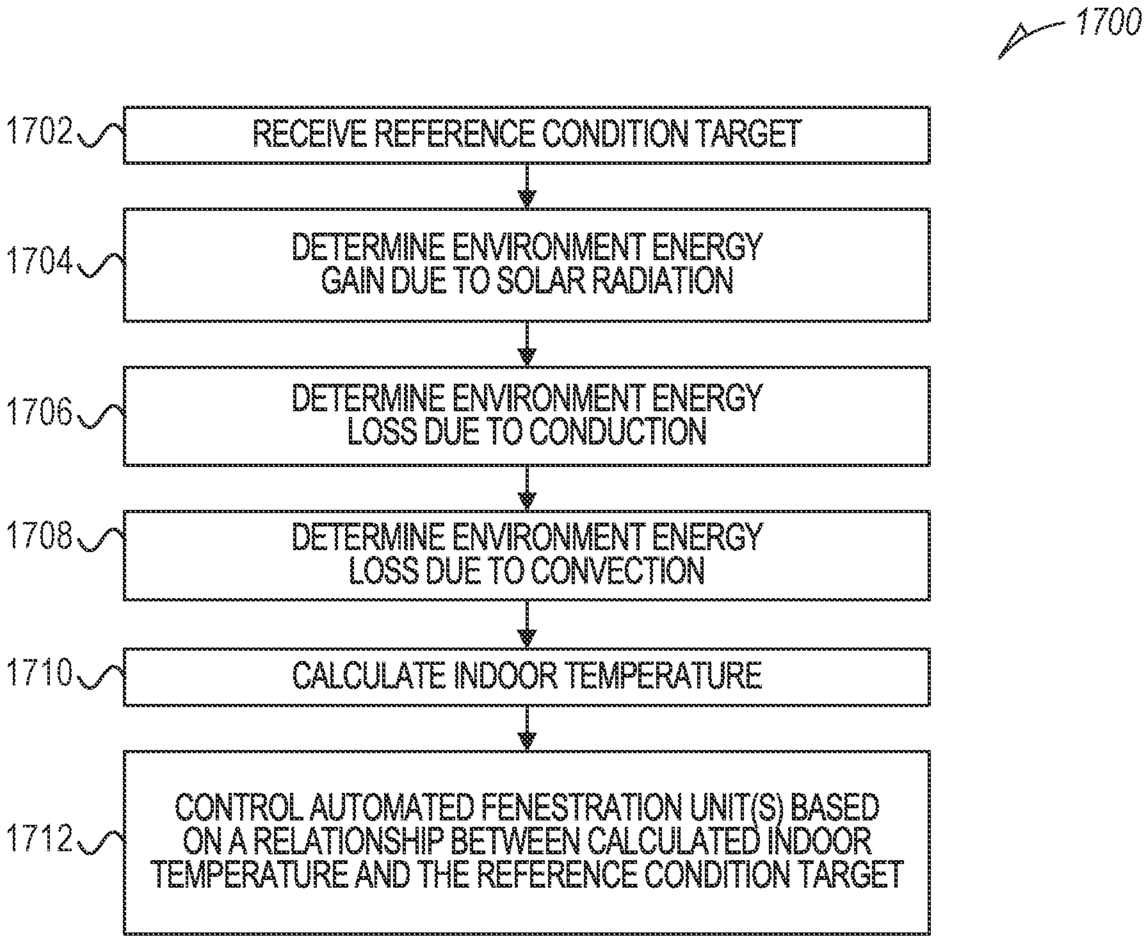
FIG. 17 illustrates generally an example of a method that can include an energy transfer example.

FIG. 17 illustrates generally an example of a method that can include an energy transfer example 1700. The energy transfer example 1700 can include controlling one or more automated fenestration units using energy gain and energy loss information about an indoor environment. At operation 1702, the example can include receiving reference condition target information, or a comfort target characteristic for an indoor environment. The target information or target characteristic can include information that defines a target comfort zone such as in terms of temperature, humidity, "feels like" temperature, air quality, ACH, or one or more other characteristics. In an example, the target can include a goal or reference objective for an indoor environment, such as maximizing a number of air exchanges per hour or per day, for example, without exceeding specified boundary conditions, such as temperature minima or maxima.

Boundary conditions for automated fenestration systems can include system operation or performance guardrails or other safety mechanisms that help ensure comfort-based control of a system does not compromise other health or safety priorities for the environment. For example, a boundary condition can include an indoor temperature minimum that is enforced regardless of any user preference for fresh air exchanges. Enforcing a minimum temperature boundary can help ensure that indoor temperatures do not reach the freezing point for water which could compromise water pipes, for example. A boundary condition can include an indoor air quality index to ensure a minimum air quality indoors, for example, for indoor environments that are in or near heavily polluted areas or areas subject to airborne allergens like pollen. In an example, a boundary condition can include a home security preference that windows are not opened by more than a specified threshold opening amount. In an example, a boundary condition can include an intolerance for rain, moisture, or other water intrusion.

In an example, a particular boundary condition can be imposed temporarily, or according to a schedule, or in response to inputs or signals from other systems. For example, particular security-based boundary conditions can be imposed or enforced when a home security system is armed, and the security-based boundary conditions can be relaxed or changed when the security system is disarmed. Boundary conditions can optionally be enforced differently for different fenestration units or groups of units in a particular environment. For example, units belonging to a ground-floor fenestration group can adhere to different security-based boundary conditions than units on upper levels.

Returning to the example of FIG. 17, at operation 1704, the energy transfer example 1700 can include determining an environment energy gain, for example, due to solar radiation. In an example, energy gain due to solar radiation can be calculated using a solar loading offset value for a particular day and date, a real-time sun conditions ratio (SCR) value, and a radiation factor ($F_{rad}$). For example, the energy gain can be expressed as SCL*SCR*$F_{rad}$, where SCL is a solar cooling load or solar loading offset. In an example, a value for the radiation factor $F_{rad}$ is about 1.

At operation 1706, the energy transfer example 1700 can include determining an environment energy loss due to conduction. In an example, energy loss due to conduction can be calculated using information about a difference between indoor and outdoor temperatures, an insulation ratio, and a conduction factor ($F_{cond}$). The conduction factor can be determined experimentally or can be calculated. For example, the energy loss can be expressed as (Outdoor temperature−Target Indoor temperature)*IR*$F_{cond}$. In an example, a value for the conduction factor $F_{cond}$ is about 1.

At operation 1708, the energy transfer example 1700 can include determining an environment energy loss due to convection. In an example, energy loss due to convection can be calculated using information about a difference between indoor and outdoor temperatures, air changes per hour or current airflow, a volume of the indoor environment, and a convection factor ($F_{conv}$). The convection factor can be determined experimentally or can be calculated. For example, the energy loss can be expressed as (Outdoor temperature−Target Indoor temperature)*ACH*Volume*$F_{conv}$. In an example, a value for the convection factor $F_{conv}$ is about 0.0028.

At operation 1710, the energy transfer example 1700 can include calculating an indoor temperature based on a sum of the determined energy gain (e.g., at operation 1704) and determined energy losses (e.g., at operation 1706 and operation 1708). The calculated indoor temperature can be expressed as a function of various environment-specific factors and a difference between actual or measured outdoor temperature and the target indoor temperature. In another example, operation 1710 can include measuring an indoor temperature using one or more temperature sensors disposed in the indoor environment. The measured indoor temperature can be processed or adjusted based on, for example, the determined energy gain and determined energy losses. In another example, a measured indoor temperature can be adjusted or offset based on information about the sensor itself, such as an elevation of the sensor, a location of the sensor inside the environment, or other information about the sensor and its behavior or responsiveness in its particular environment.

At operation 1712, the energy transfer example 1700 can include controlling one or more automated fenestration units responsive to the indoor temperature calculated at operation 1710. For example, the calculated indoor temperature can be compared to the target indoor temperature to determine a temperature difference. If the temperature difference is greater than a specified threshold amount, then the automated fenestration units can be controlled to respond by opening or closing, for example, if such opening or closing is determined to not violate one or more of the boundary conditions. The particular fenestration unit control response can be selected from the available window control stages. In an example, the temperature calculation and response (e.g., at operation 1710 and operation 1712) can comprise inputs for a machine learning-based algorithm that can be applied to tune the various control stages.

In a particular example, the indoor environment is determined to have the following characteristics:

TABLE 1

TEST INDOOR ENVIRONMENT

| Season | Time of Day | SCL | IR | ACH |
|---|---|---|---|---|
| Summer | Morning | 15 | 0.03 | 0.1 |
| Summer | Afternoon | 30 | 0.03 | 0.1 |
| Summer | Evening | 25 | 0.03 | 0.1 |
| Winter | Morning | 15 | 0.03 | 0.1 |
| Winter | Afternoon | 20 | 0.03 | 0.1 |
| Winter | Evening | 10 | 0.03 | 0.1 |
| N/A | Night | 0 | 0.03 | 0.1 |

In the example of the Test Indoor Environment for Morning, a known or measured outdoor temperature of 65 degrees, and a target indoor temperature of 72 degrees, the indoor temperature can be calculated as follows using the energy gain and energy loss expressions provided above. For example:

$$\text{Indoor temperature}=\text{outdoor temperature}+(\text{SCL}*\text{SCR}*F_{rad})+((\text{Outdoor temperature}-\text{Target Indoor temperature})*\text{IR}*F_{cond})+((\text{Outdoor temperature}-\text{Target Indoor temperature})*\text{ACH}*\text{Volume}*F_{conv}),\text{ or}$$

$$\text{Indoor temperature}=65-(15*1*1)-(7*0.03)-(7*0.1*63\ m^3*0.0028)=79.67\text{ degrees.}$$

In this example, the indoor temperature is determined to be greater than the target indoor temperature (e.g., comprising the comfort target characteristic for the indoor environment) of 72 degrees. Therefore, because the outdoor temperature is less than the calculated indoor temperature, fenestration units of the Test Indoor Environment can be controlled to open (e.g., from a closed to open position, or from a partially open to more fully open position). In an example, stage 3 opening can be calculated to increase ACH to 6 and reduce the indoor temperature by ~0.7 degrees to achieve the target indoor temperature. If the outdoor temperature is instead greater than the calculated indoor temperature, then responses other than window opening can be provided, such as turning on an air conditioner and/or closing one or more of the windows automatically.

Figure 18:
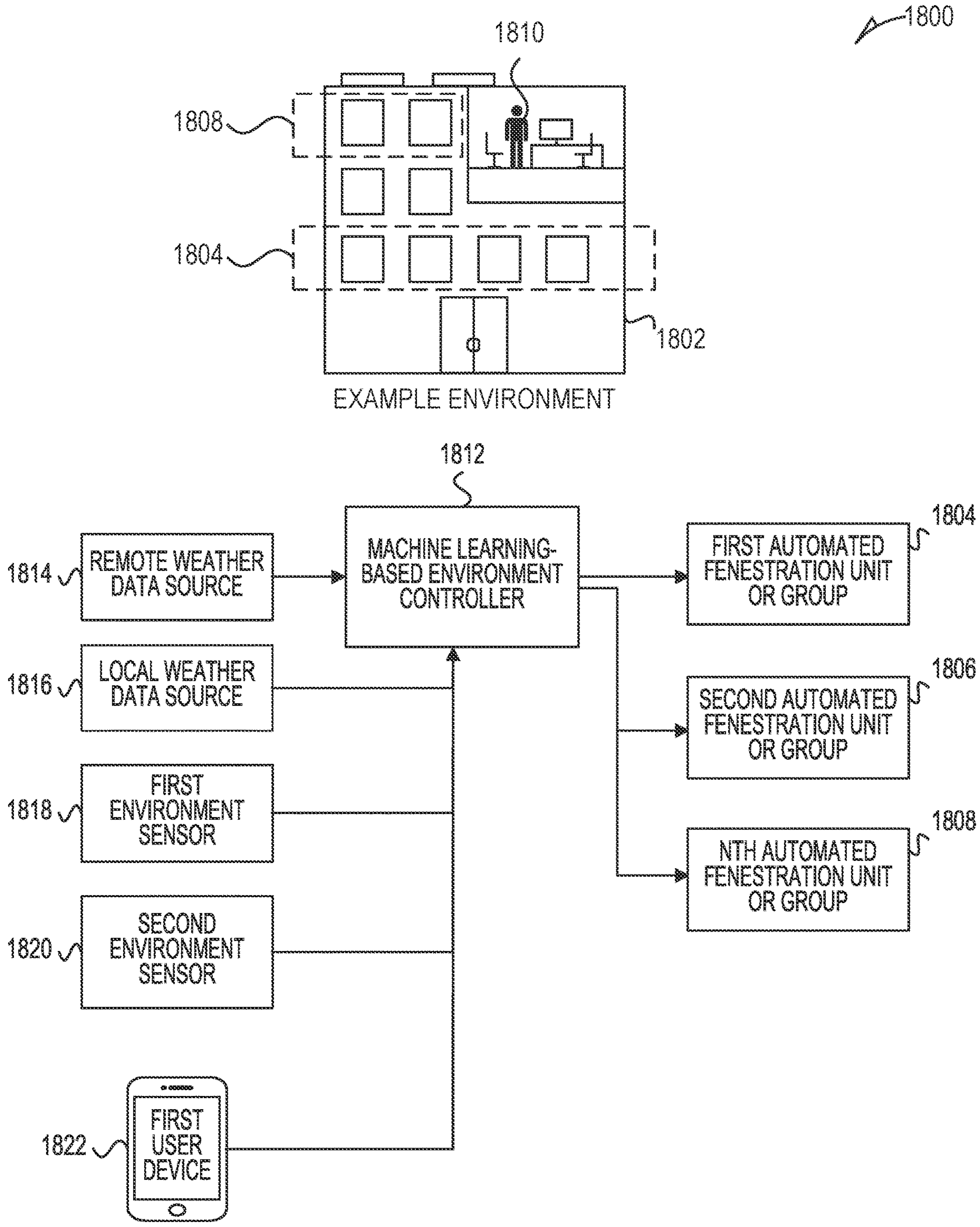
FIG. 18 illustrates generally an environment control system for an example environment with multiple automated fenestration units that can be controlled individually or collectively.

FIG. 18 illustrates generally an environment control system 1800 for an example environment 1802 with multiple automated fenestration units that can be controlled individually or collectively, such as according to the systems and methods discussed herein. In an example, the example environment 1802 can include or comprise one or multiple different indoor environments served by respective fenestration units or groups of fenestration units. In an example, the example environment 1802 includes at least a first automated fenestration unit or group 1804, a second automated fenestration unit or group 1806, and a Nth automated fenestration unit or group 1808. Each unit or group can comprise one or multiple fenestration units that can be remotely operated such as to partially or fully opened or closed positions, and in response to one or multiple respective control signals from a controller or processor circuit. The controller or processor circuit can be configured to perform a fenestration control algorithm. In an example, the various units or groups can be assigned to or controlled based on various window control stages as described elsewhere herein.

The example environment 1802 can include one or multiple sensors or environmental data sources. For example, the example environment 1802 can include a remote weather data source 1814 that provides weather data (e.g., comprising temperature, humidity, air quality, weather forecast, or other information received from a remote source, such as via the internet) to a processor circuit. The example environment 1802 can include or use a local weather data source 1816 such as can comprise one or multiple sensors that are disposed in, around, adjacent to, or nearby the example environment 1802. The weather forecast information can be used by the machine learning-based environment controller 1812 to identify a “best” time of day to open a window, or to identify one or more times of the day to inhibit or otherwise override instructions to open a window, such as when inclement weather is forecasted.

The example environment 1802 can include one or multiple sensors or environmental data sources. For example, the example environment 1802 can include or use multiple other environment sensors, such as a first environment sensor 1818, a second environment sensor 1820, or other sensor, that is configured to provide environment information to the processor circuit. The environment sensors can comprise temperature sensors, humidity sensors, particulate matter sensors, gas concentration or presence sensors, light sensors, or other sensors that can provide information about environmental conditions at, in, or near the example environment 1802. In an example, the first environment sensor 1818 includes an occupant sensor that is configured to sense information about a presence, absence, or behavior (e.g., activity level, or type of activity) of an occupant of the example environment 1802.

In an example, the example environment 1802 can be configured to implement preferences of a first user 1810. The first user 1810 can define various target comfort zone parameters that can be achieved using, e.g., the automated fenestration units and/or other home environment control systems such as HVAC systems.

In an example, the first user 1810 can have a first user device 1822 that can provide an interface between the fenestration unit controller or processor circuit and the first user 1810. For example, the first user device 1822 can comprise the operator interface 208. In an example, the first user device 1822 comprises one or more sensors that can provide information to the controller or processor circuit to influence operation of the fenestration units. In an example, the first user device 1822 can provide location information about the first user 1810, such as locations within the example environment 1802 or outside of the example environment 1802. The environment control system 1800 can be configured to optimize or change environment settings based on the detected location of the first user 1810 within the example environment 1802 or based on the proximity of the first user 1810 to the example environment 1802.

In an example, the controller can include or can be configured to implement a machine learning-based environment controller 1812 for the example environment 1802. The controller can optionally be locally implemented at the example environment 1802, or can be a cloud-based service, or can be a combination of locally implemented and cloud-based services.

The machine learning-based environment controller 1812 can be configured to receive information from one or more of the remote weather data source 1814, the local weather data source 1816, the first environment sensor 1818, the second environment sensor 1820, and the first user device 1822 and process the received information together to determine control signals for, e.g., the first automated fenestration unit or group 1804, the second automated fenestration unit or group 1806, or the Nth automated fenestration unit or group 1808, or for one or more other systems that serve the example environment 1802, such as an HVAC system.

In an example, the machine learning-based environment controller 1812 can be configured to use the various received information to determine a window control stage that can be used to attain or maintain a target comfort zone inside one or more areas of the example environment 1802. In an example, the machine learning-based environment controller 1812 can be configured to perform all or a portion of a fenestration control algorithm. For example, the machine learning-based environment controller 1812 can be configured to perform aspects of the fenestration control method 1300. In a particular example, the machine learning-based environment controller 1812 can be configured to receive or determine information about an environment comfort target characteristic for an indoor environment portion of the example environment 1802, to receive atmospheric status information about an outdoor environment at or near the example environment 1802, to receive information about, or determine, a solar loading offset for the indoor environment, and in response to such information, provide control signals to actuate one or more fenestration units that serve the indoor environment.

In an example, the machine learning-based environment controller 1812 can be configured to calculate and respond to (1) energy gain at an indoor environment, such as due to solar radiation, (2) energy loss from the indoor environment, such as due to conduction, and (3) energy loss from the indoor environment, such as due to convection.

The machine learning-based environment controller 1812 can monitor changes in the various sensor inputs and automatically identify correlations with window control stages or other indoor environment component or system changes. For example, the machine learning-based environment controller 1812 can be configured to differently weight various inputs and differently adjust the window control stage(s) to optimize a system response to changing weather conditions. The system response can depend upon or change in coordination with time of day, season, weather patterns, occupant behavior or environment use patterns, or other factors. The machine learning-based environment controller 1812 can thus optimize its responses to future conditions based on information learned from earlier conditions and responses.

In an example, the machine learning-based environment controller 1812, or other controller for implementing the fenestration control algorithm, can be used to update or adjust user-specified comfort targets. The present inventors have recognized that for many users, what feels comfortable at a particular time can depend at least in part on conditions over the last several (e.g., 1 to 3) days. For example, a particular user may indicate a comfort range of 63-74 F. If, however, the outdoor weather conditions have been warm (e.g., 60-80 F or more), then keeping windows open a few degrees below the normal range still feels comfortable to many users. However, if the outdoor weather conditions have been cooler (e.g., less than 60 F), then many users may prefer to use a higher opening temperature threshold, e.g., 70 F instead of 65 F. Similarly, users may prefer or expect their windows to stay open if the air temperature rises several degrees above their comfort range (e.g., when outdoor temperatures reach 75-80 F), for example because the mass of the indoor environment is absorbing extra energy before the user experiences the effect of such energy.

Figure 19:
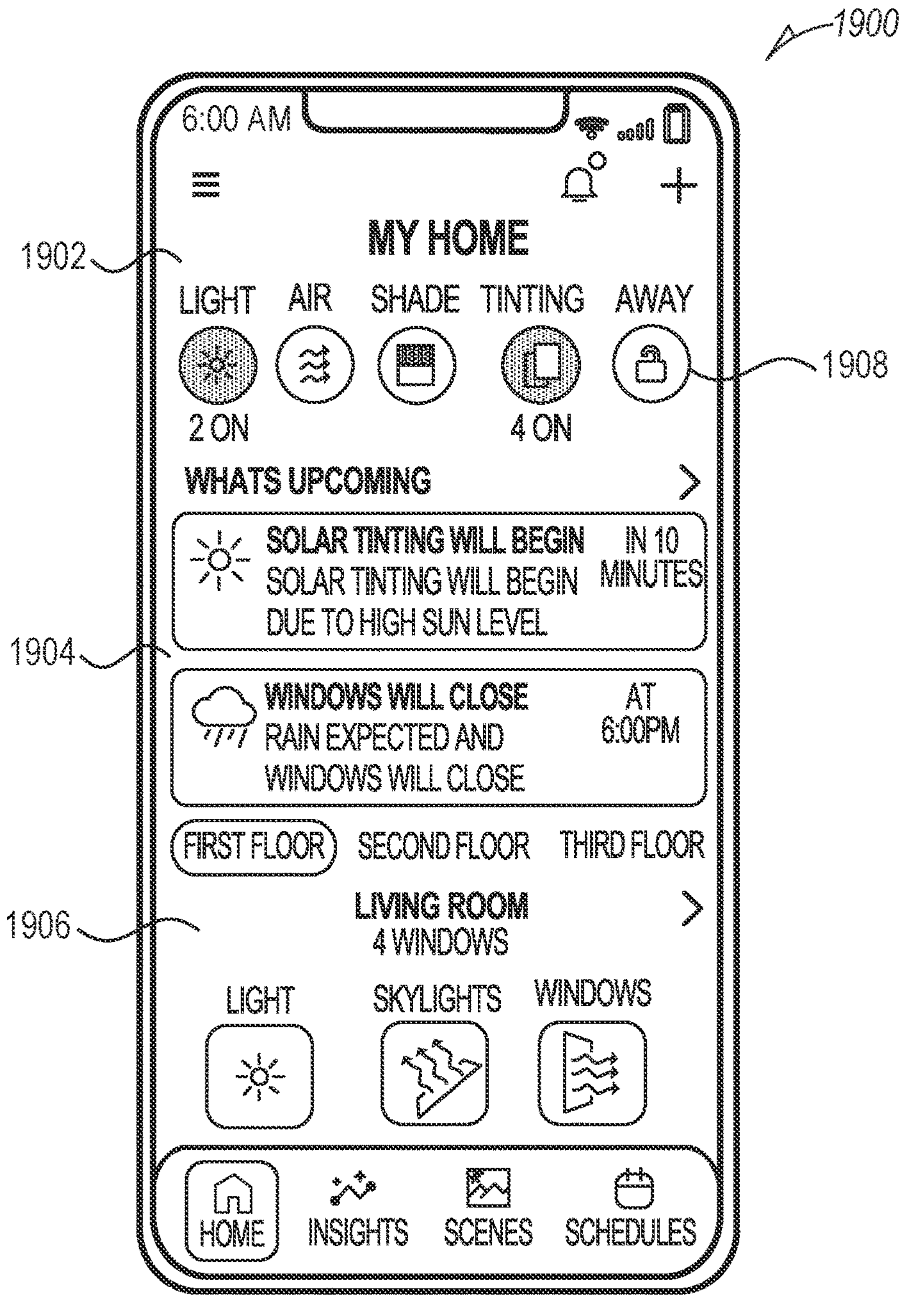
FIG. 19 illustrates generally a pictorial example of a first user interface.
Figure 21:
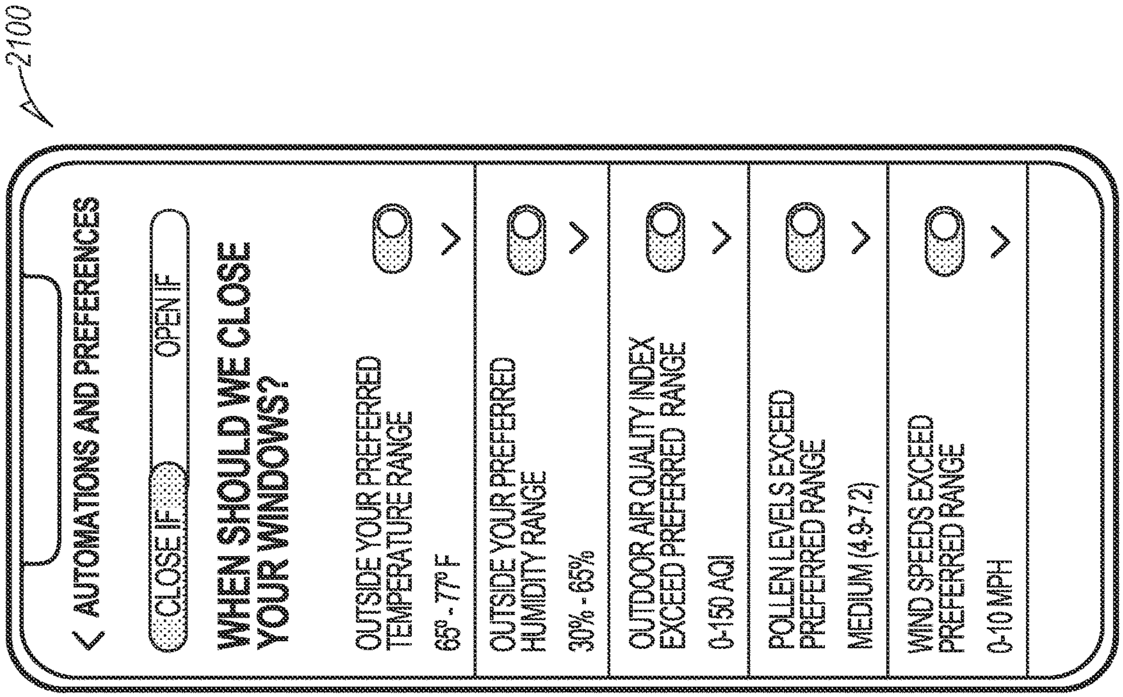
FIG. 21 illustrates generally a pictorial example of a third user interface.
Figure 20:
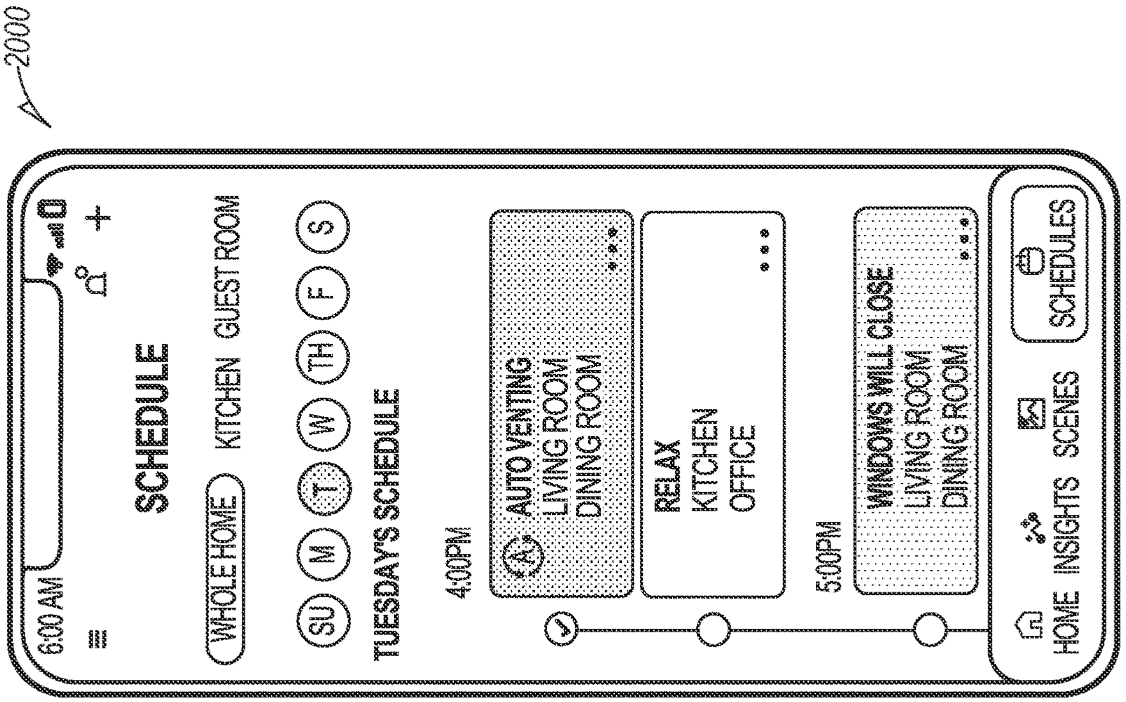
FIG. 20 illustrates generally a pictorial example of a second user interface.

Various interface devices can be used by a user to interact with or influence the operation of a fenestration control algorithm, such as to control automated or semi-automated opening or closing of fenestration units, such as for the building 100 or for or using the building services system 200. FIG. 19, FIG. 20, and FIG. 21 illustrate generally pictorial examples of respective interfaces such as can be provided using a mobile device (e.g., a mobile telephone, a tablet computer, etc.). Other devices can similarly be used.

FIG. 19 illustrates generally a pictorial example of a first user interface 1900. The first user interface 1900 can provide a user with indoor environment status information and environment control options. For example, the first user interface 1900 can be divided into multiple logical areas. The first user interface 1900 can include a mode-select area 1902, an operation summary area 1904, and an environment-specific information area 1906. The mode-select area 1902 can indicate different modes or systems that are available for user interaction. In the illustrated example, the mode-select area 1902 includes options for light control (e.g., using light-modulating devices), air control (e.g., using windows or fans), shade control (e.g., using windows, shades, drapes, or the like), tint control (e.g., using tinting windows), and an away mode 1908 control.

The mode-select area 1902 can provide status information about various components of the system. For example, the light control area indicates "2 on" to indicate that multiple light control devices are on or active, and the tint control area indicates "4 on" to indicate multiple tinted windows are actively tinted. In an example, the away mode 1908 can be activated with one button push to command the system to attain a configuration suitable for an occupant or user being away from the environment. For example, when the away mode 1908 is activated, fenestration units can be caused to close or lock and various other system devices or components can be caused to activate (e.g., a security system) or deactivate (e.g., an energy-intensive active cooling system) when an occupant is away.

In an example, the operation summary area 1904 shows system events, such as past event or upcoming events. For example, the operation summary area 1904 can indicate awareness of the system to upcoming changes or adjustments, such as can be driven by sensor data, weather data, or the like. In the example of the operation summary area 1904, a portion of the display indicates that solar tinting will begin due to high sun levels, such as to help mitigate solar loading effects. Another portion of the display indicates that windows are expected to close later in the day due to expected or forecasted rain. The operation summary area 1904 can be updated as data is refreshed and the system optimizes its performance based on real-time sensor data and external data sources.

The environment-specific information area 1906 can provide information about a specific indoor environment or portion of an indoor environment. For example, detailed information about fenestration unit status can be provided on a per-room basis. In the illustrated example, the operation summary area 1904 shows that four windows are available for control in a Living room environment. The windows can be adjusted using the interface, or automatically by the system, to modulate light or airflow.

FIG. 20 illustrates generally a pictorial example of a second user interface 2000. The second user interface 2000 can provide information about a system schedule. In an example, the system schedule can be set or defined by a user according to day or environment to be controlled. For example, global or "whole home" settings can be scheduled, or room-specific (e.g., kitchen or guest room) settings can be scheduled. The second user interface 2000 can provide a view of the different scheduled events, such as when automatic venting is scheduled, or when windows are scheduled to close, e.g., to enforce a nighttime security policy.

FIG. 21 illustrates generally a pictorial example of a third user interface 2100. The third user interface 2100 can be used to set user preferences for different automated behavior of the system. For example, the third user interface 2100 can be used to set conditions for closing windows or conditions for opening windows.

In an example, the third user interface 2100 can be used to set one or more environment comfort target characteristics for one or multiple different indoor environments. For example, the third user interface 2100 can be used to set a target temperature range, a target humidity range, a target air quality range, a target allergen range, a target maximum wind characteristic or tolerance for wind, and so on. Other system controls or attributes can be similarly configured or defined using the first user interface 1900, the second user interface 2000, or the third user interface 2100.

In an example, an interface can be configured to provide indications about a subjective Wellbeing score, such as can be based on exposure to natural light or fresh air (e.g., in hours per day, or air exchanges per hour or day). In an example, the interface can include tips or guidance for a user, such as to encourage a better or different Wellbeing score. The Wellbeing score can, for example, indicate a number of hours of exposure of an individual or environment to fresh air, sunlight, or other environmental conditions.

Figure 22:
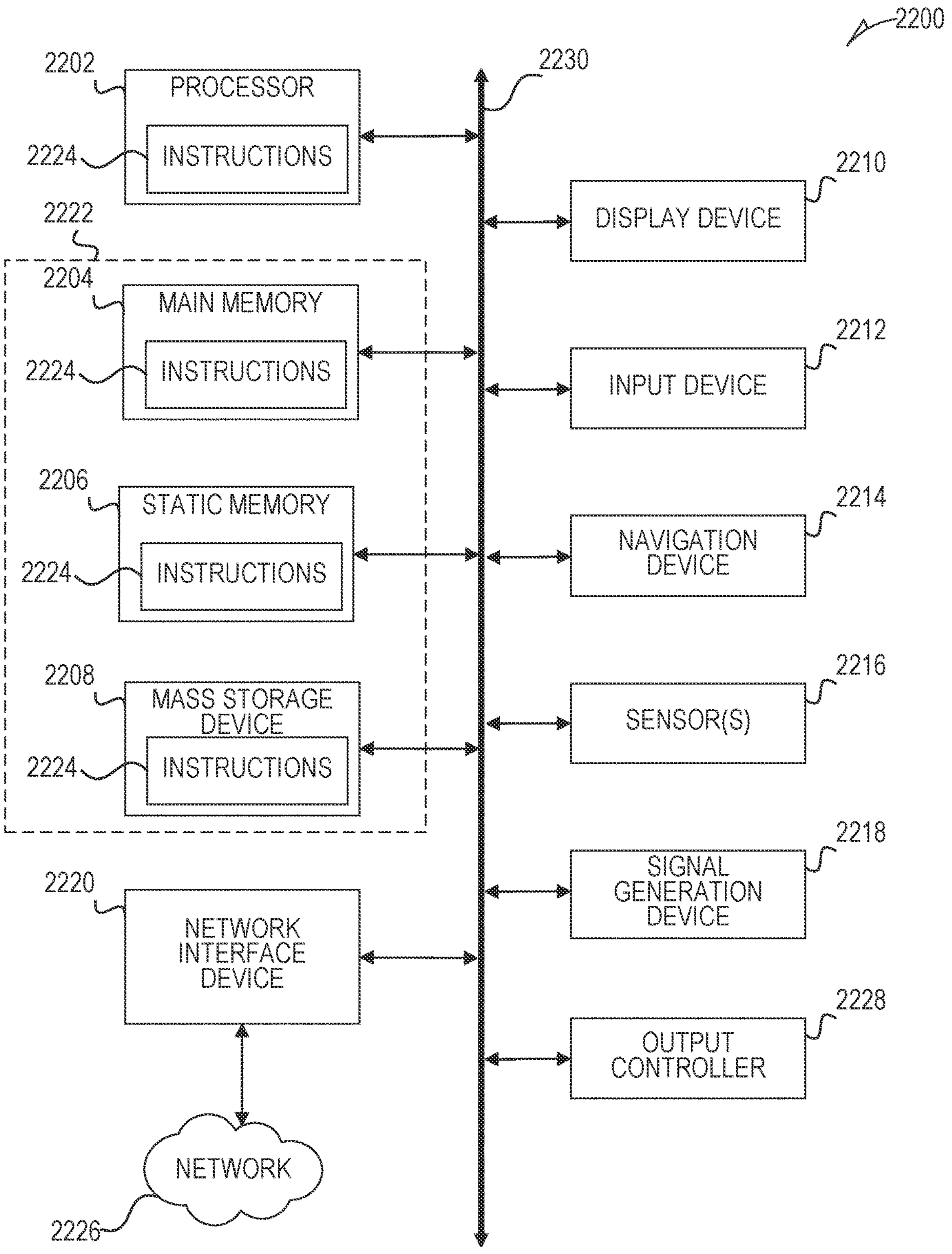
FIG. 22 illustrates a block diagram of an example machine with which, in which, or by which any one or more of the techniques discussed herein can be implemented.

FIG. 22 illustrates a block diagram of an example machine 2200 with which, in which, or by which any one or more of the techniques (e.g., methodologies) discussed herein can be implemented. For example, the machine 2200 or portions thereof can be configured to perform a fenestration control algorithm to selectively actuate one or multiple fenestration units, such as to open or close such units using drive hardware (e.g., motors or other actuators) that comprise such units. Examples, as described herein, can include, or can operate by, logic or a number of components, or mechanisms in the machine 2200. Circuitry (e.g., processing circuitry) is a collection of circuits implemented in tangible entities of the machine 2200 that include hardware (e.g., simple circuits, gates, logic, etc.). Circuitry membership can be flexible over time. Circuitries include members that can, alone or in combination, perform specified operations when operating. In an example, hardware of the circuitry can be immutably designed to carry out a specific operation (e.g., hardwired) for example a fenestration control algorithm or a portion thereof, or using a specific command execution unit thereof. In an example, the hardware of the circuitry can include variably connected physical components (e.g., command execution units, transistors, simple circuits, etc.) including a machine readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, in an example, the machine-readable medium elements are part of the circuitry or are communicatively coupled to the other components of the circuitry when the device is operating. In an example, any of the physical components can be used in more than one member of more than one circuit. For example, under operation, execution units can be used in a first circuit of a first circuitry at one point in time and reused by a second circuit in the first circuitry, or by a third circuit in a second circuitry at a different time.

In alternative embodiments, the machine 2200 can operate as a standalone device or can be connected (e.g., networked) to other machines. In a networked deployment, the machine 2200 can operate in the capacity of a server machine, a client machine, or both in server-client network environments. In an example, the machine 2200 can act as a peer machine in peer-to-peer (P2P) (or other distributed) network environment. The machine 2200 can be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

The machine 2200 (e.g., computer system) can include a hardware processor 2202 (e.g., a central processing unit (CPU), a graphics processing unit (GPU), a hardware processor core, or any combination thereof), a main memory 2204, a static memory 2206 (e.g., memory or storage for firmware, microcode, a basic-input-output (BIOS), unified extensible firmware interface (UEFI), etc.), and mass storage device 2208 or memory die stack, hard drives, tape drives, flash storage, or other block devices) some or all of which can communicate with each other via an interlink 2230 (e.g., bus). The machine 2200 can further include a display device 2210, an alphanumeric input device 2212 (e.g., a keyboard), and a user interface (UI) Navigation device 2214 (e.g., a mouse). In an example, the display device 2210, the input device 2212, and the UI navigation device 2214 can be a touch screen display. The machine 2200 can additionally include a mass storage device 2208 (e.g., a drive unit), a signal generation device 2218 (e.g., a speaker, or a particular output signal generator configured to provide signals to one or more fenestration units to thereby control such units to open or close), a network interface device 2220, and one or more sensor(s) 2216, such as a global positioning system (GPS) sensor, compass, accelerometer, or other sensor. The machine 2200 can include an output controller 2228, such as a serial (e.g., universal serial bus (USB), parallel, or other wired or wireless (e.g., infrared (IR), near field communication (NFC), etc.) connection to communicate or control one or more peripheral devices (e.g., a fenestration unit, a printer, card reader, etc.).

Registers of the hardware processor 2202, the main memory 2204, the static memory 2206, or the mass storage device 2208 can be, or include, a machine-readable media 2222 on which is stored one or more sets of data structures or instructions 2224 (e.g., software) embodying or used by any one or more of the techniques or functions described herein. The instructions 2224 can also reside, completely or at least partially, within any of registers of the hardware processor 2202, the main memory 2204, the static memory 2206, or the mass storage device 2208 during execution thereof by the machine 2200. In an example, one or any combination of the hardware processor 2202, the main memory 2204, the static memory 2206, or the mass storage device 2208 can constitute the machine-readable media 2222. While the machine-readable media 2222 is illustrated as a single medium, the term "machine-readable medium" can include a single medium or multiple media (e.g., a centralized or distributed database, or associated caches and servers) configured to store the one or more instructions 2224.

The term "machine readable medium" can include any medium that is capable of storing, encoding, or carrying instructions for execution by the machine 2200 and that cause the machine 2200 to perform any one or more of the techniques of the present disclosure, or that is capable of storing, encoding or carrying data structures used by or associated with such instructions. Non-limiting machine-readable medium examples can include solid-state memories, optical media, magnetic media, and signals (e.g., radio frequency signals, other photon-based signals, sound signals, etc.). In an example, a non-transitory machine-readable medium comprises a machine-readable medium with a plurality of particles having invariant (e.g., rest) mass, and thus are compositions of matter. Accordingly, non-transitory machine-readable media are machine readable media that do not include transitory propagating signals. Specific examples of non-transitory machine readable media can include: non-volatile memory, such as semiconductor memory devices (e.g., electrically programmable read-only memory (EPROM), electrically erasable programmable read-only memory (EEPROM)) and flash memory devices; magnetic disks, such as internal hard disks and removable disks; magneto-optical disks; and CD-ROM and DVD-ROM disks.

In an example, information stored or otherwise provided on the machine-readable media 2222 can be representative of the instructions 2224, such as instructions 2224 themselves or a format from which the instructions 2224 can be derived. This format from which the instructions 2224 can be derived can include source code, encoded instructions (e.g., in compressed or encrypted form), packaged instructions (e.g., split into multiple packages), or the like. The information representative of the instructions 2224 in the machine-readable media 2222 can be processed by processing circuitry into the instructions to implement any of the operations discussed herein. For example, deriving the instructions 2224 from the information (e.g., processing by the processing circuitry) can include: compiling (e.g., from source code, object code, etc.), interpreting, loading, organizing (e.g., dynamically or statically linking), encoding, decoding, encrypting, unencrypting, packaging, unpackaging, or otherwise manipulating the information into the instructions 2224.

The instructions 2224 can be further transmitted or received over a communications network 2226 using a transmission medium via the network interface device 2220 utilizing any one of a number of transfer protocols (e.g., frame relay, internet protocol (IP), transmission control protocol (TCP), user datagram protocol (UDP), hypertext transfer protocol (HTTP), etc.). Example communication networks can include a local area network (LAN), a wide area network (WAN), a packet data network (e.g., the Internet), mobile telephone networks (e.g., cellular networks), plain old telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 2220 can include one or more physical jacks (e.g., Ethernet, coaxial, or phone jacks) or one or more antennas to connect to the network 2226. In an example, the network interface device 2220 can include a plurality of antennas to wirelessly communicate, for example, with remotely located fenestration units or controllers. The term "transmission medium" shall be taken to include any intangible medium that is capable of storing, encoding or carrying instructions for execution by the machine 2200, and includes digital or analog communications signals or other intangible medium to facilitate communication of such software. A transmission medium is a machine readable medium.

To better illustrate the methods and systems described herein, such as can be used to control or automate control of remotely-operable fenestration units such as windows, a non-limiting set of Example embodiments are set forth below as numerically identified Examples.

Example 1 is a method comprising: receiving an environment comfort target characteristic for an indoor environment, wherein the indoor environment is separated from an outdoor environment by at least one remotely actuated fenestration unit; receiving atmospheric status information about the outdoor environment; receiving information about a solar loading offset for the indoor environment; determining a difference between the atmospheric status information and the environment comfort target characteristic; and controlling the fenestration unit to open or close based on the solar loading offset for the indoor environment and on the determined difference between the atmospheric status information and the environment comfort target characteristic. In some examples, the environment comfort target characteristic for the indoor environment is based on a user preference for particular atmospheric conditions in the outdoor environment. In other words, a user preference for particular outdoor conditions (e.g., including but not limited to a temperature or temperature range, a humidity or humidity range, or the like) can be used to determine the environment comfort target characteristic for the indoor environment. In Example 1, receiving the environment comfort target characteristic for the indoor environment can further include receiving information about a user preference for particular atmospheric conditions in the outdoor environment. The user preference can include a target temperature preference or temperature range preference, a target humidity preference or humidity range preference, and the like.

In Example 2, the subject matter of Example 1 includes, wherein receiving the atmospheric status information includes receiving outdoor temperature information about the outdoor environment; wherein determining the difference between the atmospheric status information and the environment comfort target characteristic includes determining a difference between the outdoor temperature information and the environment comfort target characteristic; and wherein controlling the fenestration unit is based on the determined difference between the outdoor temperature information and the environment comfort target characteristic.

In Example 3, the subject matter of Example 2 includes, wherein receiving the atmospheric status information includes receiving outdoor humidity information about the outdoor environment, and wherein controlling the fenestration unit is based in part on the outdoor humidity information.

In Example 4, the subject matter of Example 3 includes, calculating an adjusted humidity for the indoor environment based on the outdoor humidity information; wherein controlling the fenestration unit is based in part on the adjusted humidity for the indoor environment.

In Example 5, the subject matter of Examples 2-4 includes, wherein controlling the fenestration unit to open or close includes determining the difference between the outdoor temperature information and the environment comfort target characteristic is less than a specified threshold amount, the threshold amount corresponding to a temperature fluctuation tolerance, and in response, controlling the fenestration unit to open or to maintain an open position.

In Example 6, the subject matter of Example 5 includes, wherein controlling the fenestration unit to open includes controlling the fenestration unit to partially open.

In Example 7, the subject matter of Examples 2-6 includes, wherein controlling the fenestration unit to open or close includes determining the difference between the outdoor temperature information and the environment comfort target characteristic is greater than a specified threshold amount, the threshold amount corresponding to a temperature fluctuation tolerance, and in response, controlling the fenestration unit to close or to maintain a closed position.

In Example 8, the subject matter of Example 7 includes, wherein controlling the fenestration unit to close includes controlling the fenestration unit to partially close.

In Example 9, the subject matter of Examples 2-8 includes, wherein controlling the fenestration unit includes maintaining the fenestration unit in an open or partially open position until the difference between the outdoor temperature information and the environment comfort target characteristic exceeds a specified comfort threshold.

In Example 10, the subject matter of Examples 2-9 includes, determining an accumulated energy offset for the indoor environment; and adjusting at least one of the environment comfort target characteristic or the outdoor temperature information based on the accumulated energy offset.

In Example 11, the subject matter of Examples 1-10 includes, determining the solar loading offset based on qualitative information, received from a user, about a perceived solar loading characteristic for the indoor environment.

In Example 12, the subject matter of Examples 1-11 includes, determining the solar loading offset based on a measured solar loading characteristic for the indoor environment.

In Example 13, the subject matter of Examples 1-12 includes, determining the solar loading offset based on a geographic characteristic of the indoor environment.

In Example 14, the subject matter of Examples 1-13 includes, determining the solar loading offset based on a determined time of year.

In Example 15, the subject matter of Examples 1-14 includes, determining the solar loading offset based on a composition of the indoor environment or of the fenestration unit.

In Example 16, the subject matter of Examples 1-15 includes, determining the solar loading offset based on a deployment status of a covering or tinting for the fenestration unit.

In Example 17, the subject matter of Examples 1-16 includes, determining the solar loading offset based on weather status information received from a weather station via a network, the weather status information including information about at least one of humidity, precipitation, cloud cover, wind speed, sun angle, light intensity, and wind direction, in the outdoor environment.

In Example 18, the subject matter of Examples 1-17 includes, wherein receiving the environment comfort target characteristic for the indoor environment includes receiving information about a target temperature range for the indoor environment and/or for the outdoor environment.

In Example 19, the subject matter of Example 18 includes, wherein receiving the environment comfort target characteristic for the indoor environment includes receiving information about a target humidity range for the indoor environment and/or for the outdoor environment.

In Example 20, the subject matter of Examples 1-19 includes, wherein controlling the fenestration unit to open includes comparing the difference to a first reference temperature, and wherein controlling the fenestration unit to close includes comparing the difference to a different second reference temperature.

In Example 21, the subject matter of Examples 1-20 includes, wherein controlling the fenestration unit to open or close is further based on at least one of wind, precipitation, or air quality in the outdoor environment.

In Example 22, the subject matter of Examples 1-21 includes, wherein controlling the fenestration unit to open or close is further based on forecasted information for the outdoor environment about at least one of wind, precipitation, air quality, and cloud cover.

In Example 23, the subject matter of Examples 1-22 includes, after controlling the fenestration unit to open or close, receiving information from a user about a comfort status for the indoor environment; and based on the information from the user, updating or adjusting at least one of the solar loading offset and the environment comfort target characteristic.

In Example 24, the subject matter of Examples 1-23 includes, using a machine learning algorithm to update or adjust at least one of the solar loading offset and the environment comfort target characteristic based on inputs from the user about the comfort status for the indoor environment, wherein the inputs are received at multiple different times of day and/or at multiple different days.

In Example 25, the subject matter of Examples 1-24 includes, controlling an active heating or cooling system for the indoor environment in coordination with controlling the fenestration unit.

In Example 26, the subject matter of Examples 1-25 includes, wherein controlling the fenestration unit to open or close is further based on a security policy that defines a limit on one or more of an opening amount, a time of day, a fenestration unit location, or a detected presence or absence of a specified individual.

In Example 27, the subject matter of Example 26 includes, wherein the security policy is configured to maintain the fenestration unit in a closed position and override an instruction to open the fenestration unit, wherein the instruction is based on the solar loading offset for the indoor environment and on the determined difference between the atmospheric status information and the environment comfort target characteristic.

In Example 28, the subject matter of Examples 1-27 includes, wherein controlling the fenestration unit to open or close is further based on a health policy that defines a minimum air exchange per unit time for the indoor environment.

In Example 29, the subject matter of Examples 1-28 includes, wherein controlling the fenestration unit to open or close includes controlling a group of fenestration units to open or close in coordination.

In Example 30, the subject matter of Example 29 includes, wherein controlling the group of fenestration units includes controlling fewer than all of the fenestration units based on detected or forecasted weather information.

In Example 31, the subject matter of Examples 1-30 includes, wherein controlling the fenestration unit to open or close is further based on at least one of a time of day, a sunrise time, or a sunset time.

In Example 32, the subject matter of Examples 1-31 includes, receiving information about cloud cover for the outdoor environment and, in response, updating a value of the solar loading offset and/or updating the environment comfort target characteristic.

Example 33 is an environment control system for an indoor environment, wherein the indoor environment is separated from an outdoor environment by one or more fenestration units, the system comprising: a remotely actuated fenestration unit in an environmental barrier that separates the indoor environment from the outdoor environment; and a controller comprising a data input and a control signal output, wherein the control signal output is configured to provide a control signal to the remotely actuated fenestration unit, wherein the data input is configured to receive (1) atmospheric status information about the outdoor environment, (2) solar loading offset information for the indoor environment, and (3) an environment comfort target characteristic for the indoor environment; and wherein the controller comprises a processor circuit configured to determine a difference between the atmospheric status information and the environment comfort target characteristic; and wherein the controller is configured to provide the control signal to open or close the fenestration unit based on the solar loading offset information and on the determined difference between the atmospheric status information and the environment comfort target characteristic. In some examples, the environment comfort target characteristic for the indoor environment is based on a user preference for particular atmospheric conditions in the outdoor environment. In other words, a user preference for particular outdoor conditions (e.g., including but not limited to a temperature or temperature range, a humidity or humidity range, or the like) can be used to determine the environment comfort target characteristic for the indoor environment.

In Example 34, the subject matter of Example 33 includes, wherein the atmospheric status information about the outdoor environment comprises temperature or humidity information.

In Example 35, the subject matter of Example 34 includes, wherein the processor circuit is configured to determine an adjusted humidity for the indoor environment based on the humidity information, and wherein the controller is configured to provide the control signal to open or close the fenestration unit based at least in part on the adjusted humidity.

In Example 36, the subject matter of Examples 33-35 includes, wherein the controller is configured to determine the solar loading offset based on one or more of: qualitative information, received from a user, about a perceived solar loading characteristic for the indoor environment; a measured solar loading characteristic for the indoor environment; a geographic characteristic of the indoor environment; a determined time of year; a composition of the indoor environment; a composition of the remotely actuated fenestration unit; a deployment status of a covering for the remotely actuated fenestration unit; weather status information received from a remote weather station via a network, the weather status information including information about at least one of precipitation, cloud cover, wind speed, and wind direction in the outdoor environment.

In Example 37, the subject matter of Examples 33-36 includes, wherein the controller is configured to poll, via a network, a weather station for the atmospheric status information including information about an outdoor temperature of the outdoor environment.

In Example 38, the subject matter of Example 37 includes, wherein the controller is configured to receive weather forecast information about the outdoor environment from the weather station, and wherein the controller is configured to control the fenestration unit to open or close based on the forecast information, the solar loading offset for the indoor environment, and the difference between the outdoor temperature of the outdoor environment and the environment comfort target characteristic.

In Example 39, the subject matter of Examples 33-38 includes, wherein the controller is configured to control the fenestration unit to maintain an at least partially open position when the difference between the atmospheric status information and the environment comfort target characteristic is less than a specified threshold difference amount.

Example 40 is a method comprising: receiving a reference condition target for an indoor environment, wherein an outdoor environment is separated from the indoor environment by at least one remotely actuated fenestration unit; determining an energy gain characteristic of the indoor environment; determining an energy loss characteristic of the indoor environment; calculating an expected indoor temperature for the indoor environment based on the determined energy gain and loss characteristics of the indoor environment; and based on a difference between the expected indoor temperature and the reference condition target for the indoor environment, selectively controlling the fenestration unit to open or close.

In Example 41, the subject matter of Example 40 includes, wherein receiving the reference condition target includes receiving a target temperature for the indoor environment.

In Example 42, the subject matter of Examples 40-41 includes, wherein receiving the reference condition target includes receiving information about a user preference for a minimum number of air changes in the indoor environment within a specified time interval.

In Example 43, the subject matter of Examples 40-42 includes, wherein determining the energy gain characteristic of the indoor environment includes determining an energy gain characteristic of the indoor environment due to solar radiation received by the indoor environment.

In Example 44, the subject matter of Examples 40-43 includes, wherein determining the energy loss characteristic of the indoor environment includes determining an energy loss characteristic of the indoor environment due to conduction from the indoor environment.

In Example 45, the subject matter of Examples 40-44 includes, wherein determining the energy loss characteristic of the indoor environment includes determining an energy loss characteristic of the indoor environment due to convection from the indoor environment.

In Example 46, the subject matter of Examples 40-45 includes, wherein selectively controlling the fenestration unit includes based on a result of a machine learning-based analysis of the difference between the expected indoor temperature and the reference condition, and wherein the result includes information about a particular fenestration unit, from multiple available fenestration units, to control to change a temperature characteristic of the indoor environment.

Example 47 is a system comprising: a remotely actuated fenestration unit; and a controller coupled to the fenestration unit and configured to provide a control signal to open or close the fenestration unit based on (1) information, received by the controller, about a target temperature for an environment, (2) an energy gain characteristic for the environment, and (3) an energy loss characteristic for the environment.

In Example 48, the subject matter of Example 47 includes, wherein the controller is configured to determine the energy gain characteristic for the environment based on a solar loading offset and a sun exposure characteristic for the environment.

In Example 49, the subject matter of Example 48 includes, wherein the solar loading offset is a function of a date, season, or time-of-day.

In Example 50, the subject matter of Examples 47-49 includes, wherein the controller is configured to determine the energy loss characteristic for the environment based on conduction losses and convection losses for the environment.

In Example 51, the subject matter of Example 50 includes, wherein the conduction losses are based in part on an insulation characteristic of the environment and a temperature difference between the environment temperature and an outdoor temperature adjacent to the environment.

In Example 52, the subject matter of Examples 50-51 includes, wherein the convection losses are based in part on an air change characteristic of the environment and a temperature difference between the environment temperature and an outdoor temperature adjacent to the environment.

In Example 53, the subject matter of Examples 47-52 includes, wherein the controller is configured to use information about an environmental boundary condition preference for the environment to control actuation of the fenestration unit.

In Example 54, the subject matter of Example 53 includes, wherein the environmental boundary condition preference comprises one or more of a minimum indoor temperature, a maximum indoor temperature, a minimum air quality, a maximum gas concentration, or an environment security preference.

In Example 55, the subject matter of Examples 47-54 includes, wherein the controller comprises a machine learning-based environment controller that is configured to use information received over time about temperature and humidity changes in the environment to influence actuation of the fenestration unit.

In Example 56, the subject matter of Example 55 includes, wherein the machine learning-based environment controller is further configured to use occupant behavior information received over time about behavior of an occupant in the environment to influence actuation of the fenestration unit.

In Example 57, the subject matter of Examples 55-56 includes, wherein the machine learning-based environment controller is configured to test different amounts of fenestration unit opening or closing in response to temperature changes in the environment and to select for use a particular fenestration unit opening or closing amount to achieve a target temperature for the environment.

Example 58 is an indoor environment control system comprising: a remotely actuated fenestration assembly; an environmental sensor; a memory storing information about health, comfort, safety, and/or energy usage goals for multiple different indoor environment occupants; and a processor circuit configured to use the information about the health, comfort, safety, and/or energy usage goals from the memory and information from the sensor to generate a control signal to control opening or closing of the fenestration assembly.

In Example 59, the subject matter of Example 58 includes, multiple remotely actuated fenestration assemblies, wherein the processor circuit is configured to use information from the memory and the sensor to coordinate opening or closing of the fenestration assemblies to achieve an air quality or air circulation goal, wherein the goal is specified by one or more of the occupants.

In Example 60, the subject matter of Examples 58-59 includes, multiple remotely actuated fenestration assemblies, wherein the processor circuit is configured to use information from the memory and the sensor to resolve conflicting preferences of the multiple different occupants and correspondingly control operation of the fenestration assemblies to achieve an air quality, comfort, security, and/or energy usage goal.

Example 61 is at least one machine-readable medium including instructions that, when executed by processing circuitry, cause the processing circuitry to perform operations to implement of any of Examples 1-60.

Example 62 is an apparatus comprising means to implement of any of Examples 1-60.

Example 63 is a system to implement of any of Examples 1-60.

Example 64 is a method to implement of any of Examples 1-60.

Each of these non-limiting examples can stand on its own, or can be combined in various permutations or combinations with one or more of the other examples.

The above description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Geometric terms, such as "parallel", "perpendicular", "round", or "square", are not intended to require absolute mathematical precision, unless the context indicates otherwise. Instead, such geometric terms allow for variations due to manufacturing or equivalent functions. For example, if an element is described as "round" or "generally round," a component that is not precisely circular (e.g., one that is slightly oblong or is a many-sided polygon) is still encompassed by this description.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

What is claimed is:

1. An environment control system for an indoor environment, wherein the indoor environment is separated from an outdoor environment by one or more fenestration units, the system comprising:

a remotely actuated fenestration unit in an environmental barrier that separates the indoor environment from the outdoor environment; and a controller comprising a data input and a control signal output, wherein the control signal output is configured to provide a control signal to the remotely actuated fenestration unit;

wherein the data input is configured to receive (1) atmospheric status information about the outdoor environment, (2) solar loading offset information for the indoor environment, wherein the solar loading offset information comprises a value representing a user-perceived susceptibility of the indoor environment to temperature changes in response to changes in incident solar radiation, and (3) an environment comfort target characteristic for the indoor environment; and wherein the controller comprises a processor circuit configured to determine a difference between the atmospheric status information and the environment comfort target characteristic; and wherein the controller is configured to provide the control signal to open or close the fenestration unit based on the solar loading offset information and on the determined difference between the atmospheric status information and the environment comfort target characteristic.

2. The environment control system of claim 1, wherein the environment comfort target characteristic for the indoor environment is based on a user preference for particular atmospheric conditions in the outdoor environment.

3. The environment control system of claim 1, wherein the atmospheric status information about the outdoor environment comprises temperature and humidity information.

4. The environment control system of claim 3, wherein the processor circuit is configured to determine an adjusted humidity for the indoor environment based on the humidity information, and wherein the controller is configured to provide the control signal to open or close the fenestration unit based at least in part on the adjusted humidity.

5. The environment control system of claim 1, wherein the controller is configured to determine the solar loading offset based on one or more of:

qualitative information, received from a user, about a perceived solar loading characteristic for the indoor environment;

a measured solar loading characteristic for the indoor environment;

a geographic characteristic of the indoor environment;

a determined time of year;

a composition of the indoor environment;

a composition of the remotely actuated fenestration unit;

a deployment status of a covering for the remotely actuated fenestration unit; and weather status information received from a remote weather station via a network, the weather status information including information about at least one of precipitation, cloud cover, wind speed, and wind direction in the outdoor environment.

6. The environment control system of claim 1, wherein the controller is configured to poll, via a network, a weather station for the atmospheric status information including information about an outdoor temperature of the outdoor environment;

wherein the controller is configured to receive weather forecast information about the outdoor environment from the weather station; and wherein the controller is configured to control the fenestration unit to open or close based on the forecast information, the solar loading offset for the indoor environment, and the difference between the outdoor temperature of the outdoor environment and the environment comfort target characteristic.

7. The environment control system of claim 1, wherein the controller is configured to control the fenestration unit to maintain an at least partially open position when the difference between the atmospheric status information and the environment comfort target characteristic is less than a specified threshold difference amount.

8. A method comprising:

receiving an environment comfort target characteristic for an indoor environment, wherein the indoor environment is separated from an outdoor environment by at least one remotely actuated fenestration unit;

receiving atmospheric status information about the outdoor environment;

receiving information about a solar loading offset for the indoor environment, wherein the solar loading offset comprises a value representing a user-perceived susceptibility of the indoor environment to temperature changes in response to changes in incident solar radiation;

determining a difference between the atmospheric status information and the environment comfort target characteristic; and controlling the fenestration unit to open or close based on the solar loading offset for the indoor environment and on the determined difference between the atmospheric status information and the environment comfort target characteristic.

9. The method of claim 8, wherein receiving the environment comfort target characteristic for the indoor environment includes receiving information about a user preference for particular atmospheric conditions in the outdoor environment.

10. The method of claim 9, wherein receiving information about the user preference includes receiving user preferences for a target temperature range and a target humidity range for user comfort in the outdoor environment.

11. The method of claim 8, wherein receiving the atmospheric status information includes receiving outdoor temperature information about the outdoor environment;

wherein determining the difference between the atmospheric status information and the environment comfort target characteristic includes determining a difference between the outdoor temperature information and the environment comfort target characteristic; and wherein controlling the fenestration unit is based on the determined difference between the outdoor temperature information and the environment comfort target characteristic.

12. The method of claim 11, wherein receiving the atmospheric status information includes receiving outdoor humidity information about the outdoor environment, and wherein controlling the fenestration unit is based in part on the outdoor humidity information.

13. The method of claim 12, comprising calculating an adjusted humidity for the indoor environment based on the outdoor humidity information;

wherein controlling the fenestration unit is based in part on the adjusted humidity for the indoor environment.

14. The method of claim 11, wherein controlling the fenestration unit to open or close includes determining the difference between the outdoor temperature information and the environment comfort target characteristic is less than a specified threshold amount, the threshold amount corresponding to a temperature fluctuation tolerance, and in response, controlling the fenestration unit to fully open, to partially open, or to maintain an open position.

15. The method of claim 11, wherein controlling the fenestration unit to open or close includes determining the difference between the outdoor temperature information and the environment comfort target characteristic is greater than a specified threshold amount, the threshold amount corresponding to a temperature fluctuation tolerance, and in response, controlling the fenestration unit to fully close, to partially close, or to maintain a closed position.

16. The method of claim 11, wherein controlling the fenestration unit includes maintaining the fenestration unit in an open or partially open position until the difference between the outdoor temperature information and the environment comfort target characteristic exceeds a specified comfort threshold.

17. The method of claim 11, further comprising determining an accumulated energy offset for the indoor environment; and adjusting at least one of the environment comfort target characteristic or the outdoor temperature information based on the accumulated energy offset.

18. The environment control system of claim 1, wherein the solar loading offset information comprises a user-provided value on a numerical scale representing a degree to which the indoor environment is perceived to retain thermal energy from solar radiation over time and the value accounts for accumulated energy effects of thermal mass in the indoor environment.

19. The method of claim 8, further comprising determining the solar loading offset based on a measured solar loading characteristic for the indoor environment.

20. The method of claim 8, further comprising determining the solar loading offset based on a geographic characteristic of the indoor environment.

21. The method of claim 8, further comprising determining the solar loading offset based on a determined time of year.

22. The method of claim 8, further comprising determining the solar loading offset based on a composition of the indoor environment or of the fenestration unit.

23. The method of claim 8, further comprising determining the solar loading offset based on a deployment status of a covering or tinting for the fenestration unit.

24. The method of claim 8, further comprising determining the solar loading offset based on weather status information received from a weather station via a network, the weather status information including information about at least one of humidity, precipitation, cloud cover, wind speed, sun angle, light intensity, and wind direction, in the outdoor environment.

25. The method of claim 8, wherein receiving the environment comfort target characteristic for the indoor environment includes receiving information about a target temperature range and a target humidity range for the indoor environment.

26. The method of claim 25, wherein receiving the environment comfort target characteristic for the indoor environment includes receiving information about a target temperature range and a target humidity range for the outdoor environment.

27. The method of claim 8, wherein controlling the fenestration unit to open includes comparing the difference to a first reference temperature, and wherein controlling the fenestration unit to close includes comparing the difference to a different second reference temperature.

28. The method of claim 8, wherein controlling the fenestration unit to open or close is further based on forecasted information for the outdoor environment about at least one of wind, precipitation, air quality, and cloud cover.

29. The method of claim 8, further comprising:

after controlling the fenestration unit to open or close, receiving information from a user about a comfort status for the indoor environment; and based on the information from the user, updating or adjusting at least one of the solar loading offset and the environment comfort target characteristic.

30. The method of claim 8, further comprising using a machine learning algorithm to update or adjust at least one of the solar loading offset and the environment comfort target characteristic based on inputs from the user about the comfort status for the indoor environment, wherein the inputs are received at multiple different times of day and/or at multiple different days.

31. The method of claim 8, further comprising controlling an active heating or cooling system for the indoor environment in coordination with controlling the fenestration unit.

32. The method of claim 8, wherein controlling the fenestration unit to open or close is further based on a security policy that defines a limit on one or more of an opening amount, a time of day, a fenestration unit location, or a detected presence or absence of a specified individual.

33. The method of claim 8, wherein controlling the fenestration unit to open or close is further based on a health policy that defines a minimum air exchange per unit time for the indoor environment.

34. The method of claim 8, wherein controlling the fenestration unit to open or close is further based on at least one of a time of day, a sunrise time, or a sunset time.

35. The method of claim 8, further comprising receiving information about cloud cover for the outdoor environment and, in response, updating a value of the solar loading offset and/or updating the environment comfort target characteristic.

36. A method comprising:

receiving a reference condition target for an indoor environment, wherein an outdoor environment is separated from the indoor environment by at least one remotely actuated fenestration unit;

receiving solar loading offset information for the indoor environment, wherein the solar loading offset information comprises a value representing a user-perceived susceptibility of the indoor environment to temperature changes in response to changes in incident solar radiation;

determining an energy gain characteristic of the indoor environment based on the solar loading offset information;

determining an energy loss characteristic of the indoor environment;

calculating an expected indoor temperature for the indoor environment based on the determined energy gain and loss characteristics of the indoor environment; and based on a difference between the expected indoor temperature and the reference condition target for the indoor environment, selectively controlling the fenestration unit to open or close.

37. The method of claim 36, wherein receiving the reference condition target includes receiving a target temperature for the indoor environment.

38. The method of claim 37, wherein receiving the reference condition target includes receiving information about a user preference for a minimum number of air changes in the indoor environment within a specified time interval.

39. The method of claim 36, wherein determining the energy gain characteristic of the indoor environment includes determining an energy gain characteristic of the indoor environment due to solar radiation received by the indoor environment; and wherein determining the energy loss characteristic of the indoor environment includes determining an energy loss characteristic of the indoor environment due to conduction from the indoor environment and due to convection from the indoor environment.

40. The method of claim 36, wherein selectively controlling the fenestration unit includes based on a result of a machine learning-based analysis of the difference between the expected indoor temperature and the reference condition, and wherein the result includes information about a particular fenestration unit, from multiple available fenestration units, to control to change a temperature characteristic of the indoor environment.

* * * * *